US011186445B2

(12) United States Patent
    Otsuru

(10) Patent No.: US 11,186,445 B2
(45) Date of Patent: Nov. 30, 2021

(54) PICKING SYSTEM

(71) Applicants: KABUSHIKI KAISHA TOSHIBA, Minato-ku (JP); Toshiba Infrastructure Systems & Solutions Corporation, Kawasaki (JP)

(72) Inventor: Yoshihide Otsuru, Yokohama (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/807,682

(22) Filed: Mar. 3, 2020

(65) Prior Publication Data

US 2020/0198899 A1   Jun. 25, 2020

Related U.S. Application Data

(63) Continuation of application No. PCT/JP2018/034277, filed on Sep. 14, 2018.

(30) Foreign Application Priority Data

Nov. 2, 2017  (JP) .............................. JP2017-213244

(51) Int. Cl.
    *B65G 47/24*     (2006.01)
    *B65G 47/248*    (2006.01)
    (Continued)

(52) U.S. Cl.
    CPC .......... *B65G 47/248* (2013.01); *B25J 9/0093* (2013.01); *B25J 9/1612* (2013.01); *B25J 9/1697* (2013.01);
    (Continued)

(58) Field of Classification Search
    CPC ................ B65G 47/244; B65G 17/323; B65G 2203/0225; B65G 47/248; B65G 47/91;
    (Continued)

(56) References Cited

U.S. PATENT DOCUMENTS 10,005,188 B2 *  6/2018  Akama ................. B25J 9/0051
2004/0197184 A1  10/2004 Sugiyama et al.
(Continued)

FOREIGN PATENT DOCUMENTS

DE   10 2010 002 317 A1   8/2011
JP       1-162649 A        6/1989
(Continued)

OTHER PUBLICATIONS

International Search Report dated Dec. 18, 2018 in PCT/JP2018/034277 dated Sep. 14, 2018, 1 page.
(Continued)

*Primary Examiner* — Lynn E Schwenning
(74) *Attorney, Agent, or Firm* — Oblon, McClelland, Maier & Neustadt, L.L.P.

(57) ABSTRACT

According to the present embodiment, a picking system includes a control device configured to control a suction device and a moving device, wherein when it is determined that a transport target article needs to be moved to a transport target position with a front side and back side of the transport target article turned over, the control device causes a suction unit to suction the transport target article, the moving device to transport the transport target article to a position above the transport target position, a turning-over section to set the suction hand to an orientation in which the transport target article is positioned above the suction unit and a direction substantially orthogonal to the suction surface is inclined with respect to the gravity direction.

2 Claims, 16 Drawing Sheets

(51) Int. Cl.
  *B25J 9/00* (2006.01)
  *B25J 9/16* (2006.01)
  *B25J 15/06* (2006.01)
  *B65G 47/91* (2006.01)

(52) U.S. Cl.
  CPC ........ *B25J 15/0616* (2013.01); *B65G 47/917* (2013.01); *B65G 2201/0235* (2013.01); *B65G 2203/044* (2013.01)

(58) Field of Classification Search
  CPC .... B65G 47/914; B65G 47/915; B25J 9/0093; B25J 15/065; B65H 2301/324; B65H 2301/33224
  USPC ......... 271/184, 185, 398; 198/379, 398, 399
  See application file for complete search history.

(56) References Cited

U.S. PATENT DOCUMENTS

| | | | |
|---|---|---|---|
| 2007/0256909 A1 | 11/2007 | Shimomae et al. | |
| 2008/0093371 A1* | 4/2008 | Ubidia | B65G 47/917 221/1 |
| 2010/0135760 A1* | 6/2010 | Hjornet | B65B 35/18 414/744.8 |
| 2014/0277721 A1 | 9/2014 | Tomo et al. | |
| 2015/0274447 A1* | 10/2015 | McCollum | B25J 15/10 414/792.6 |
| 2016/0347558 A1 | 12/2016 | Eto et al. | |

FOREIGN PATENT DOCUMENTS

| | | |
|---|---|---|
| JP | 5-14020 A | 2/1993 |
| JP | 7-7886 A | 2/1995 |
| JP | 8-243961 A | 9/1996 |
| JP | 10-129832 A | 5/1998 |
| JP | 2005-262843 A | 9/2005 |
| JP | 2007-076753 A | 3/2007 |
| JP | 2014-176926 A | 9/2014 |
| JP | 2016-22377 A | 2/2016 |
| JP | 2016-222377 A | 12/2016 |
| JP | 2017-19005 A | 1/2017 |

OTHER PUBLICATIONS

Extended European Search Report dated Feb. 16, 2021 in European Patent Application No. 18871961.1, 8 pages.

* cited by examiner

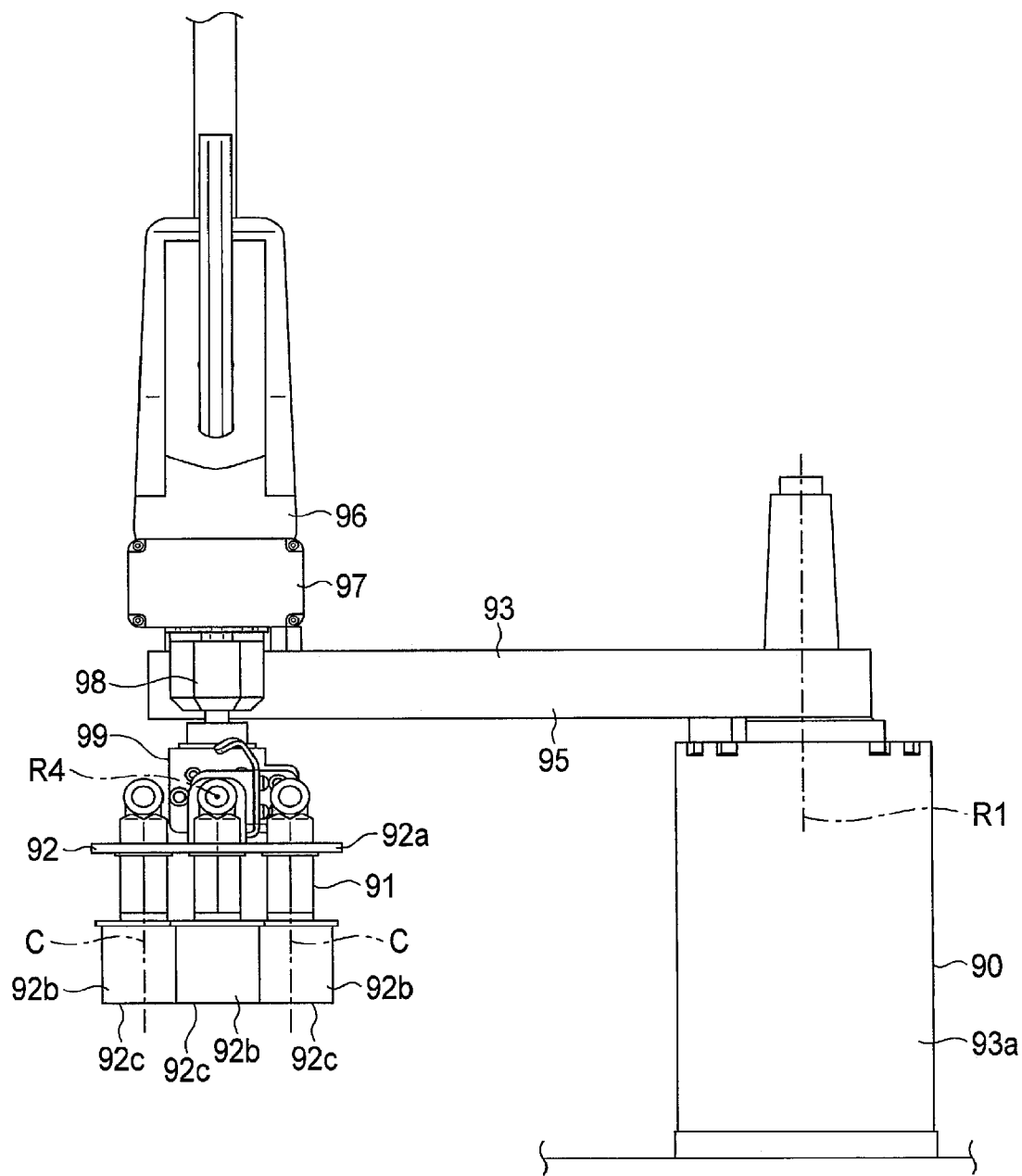
F I G. 4

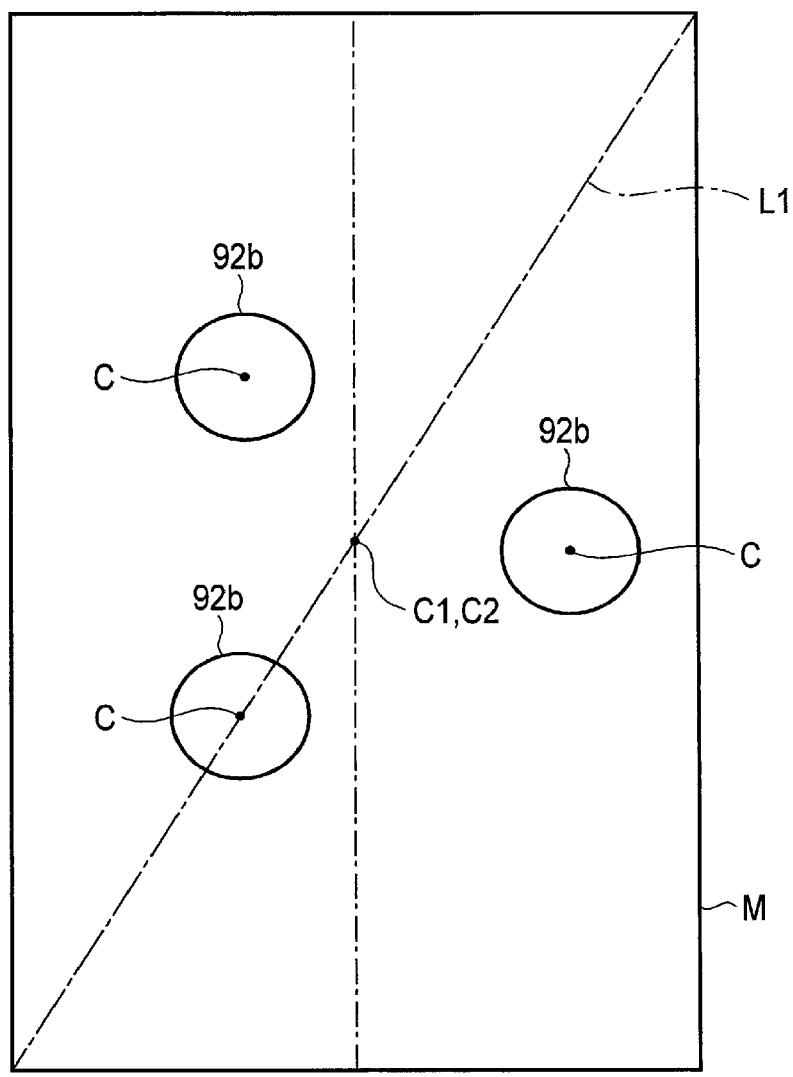
F I G. 11

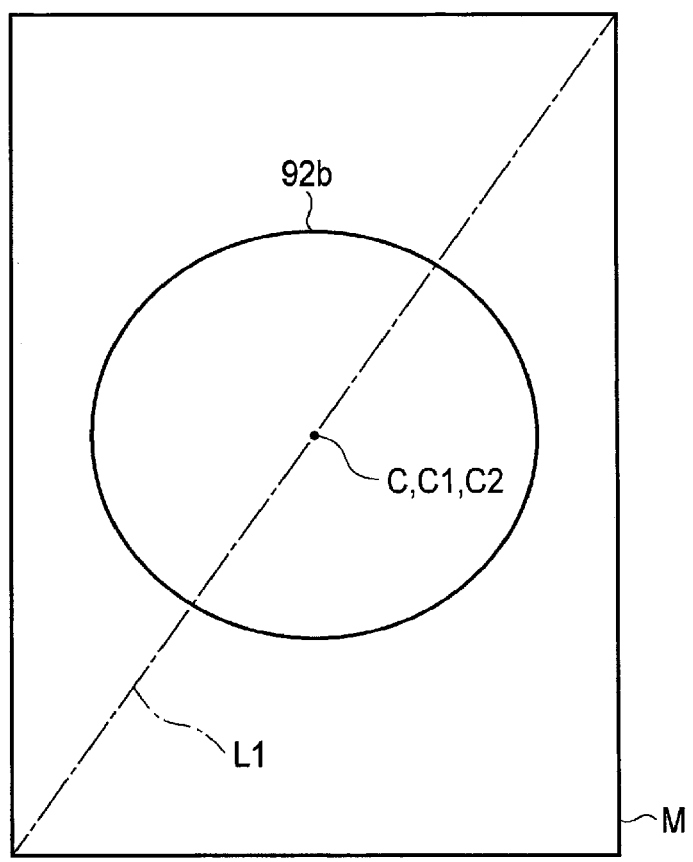
F I G. 13

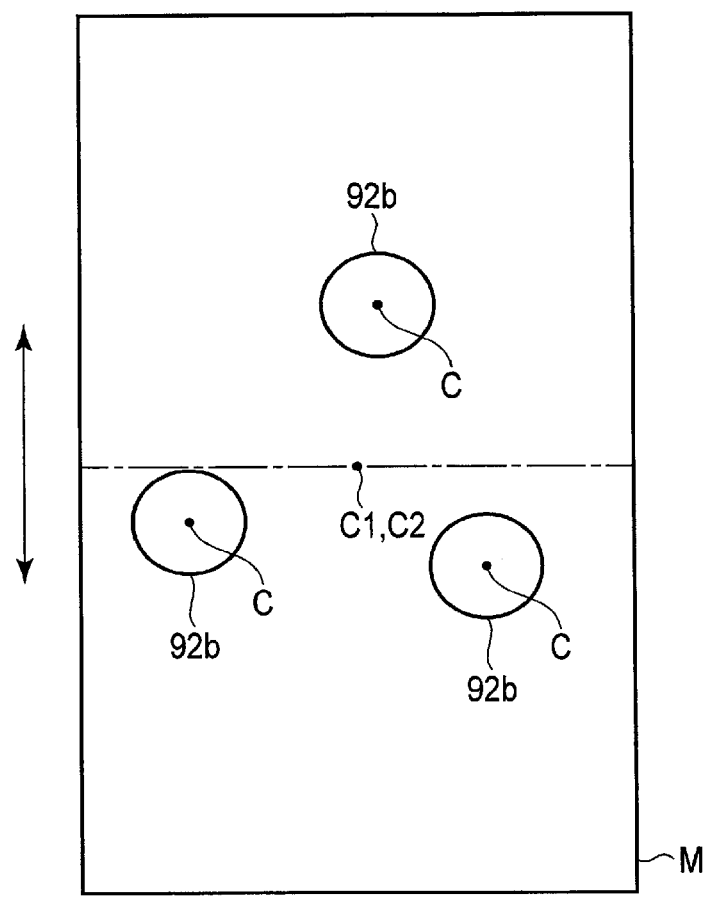
F I G. 14

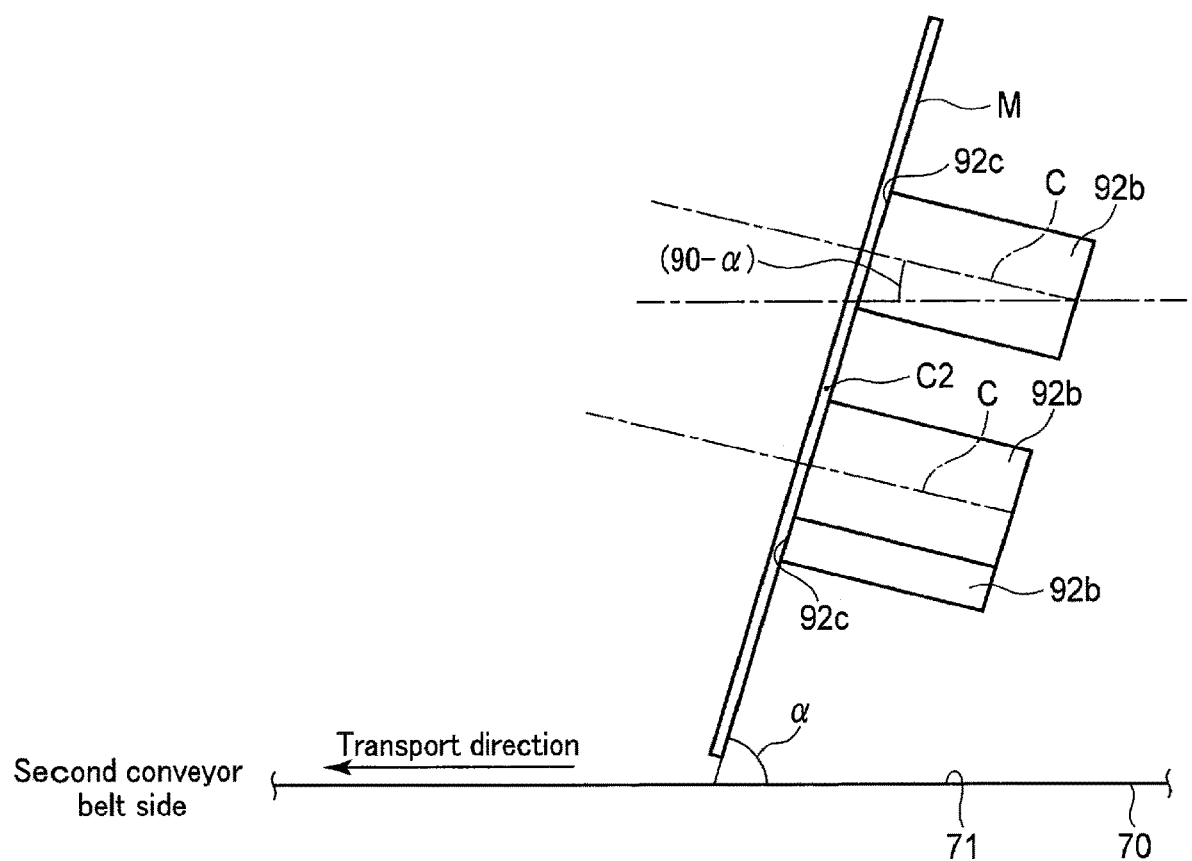
F I G. 15

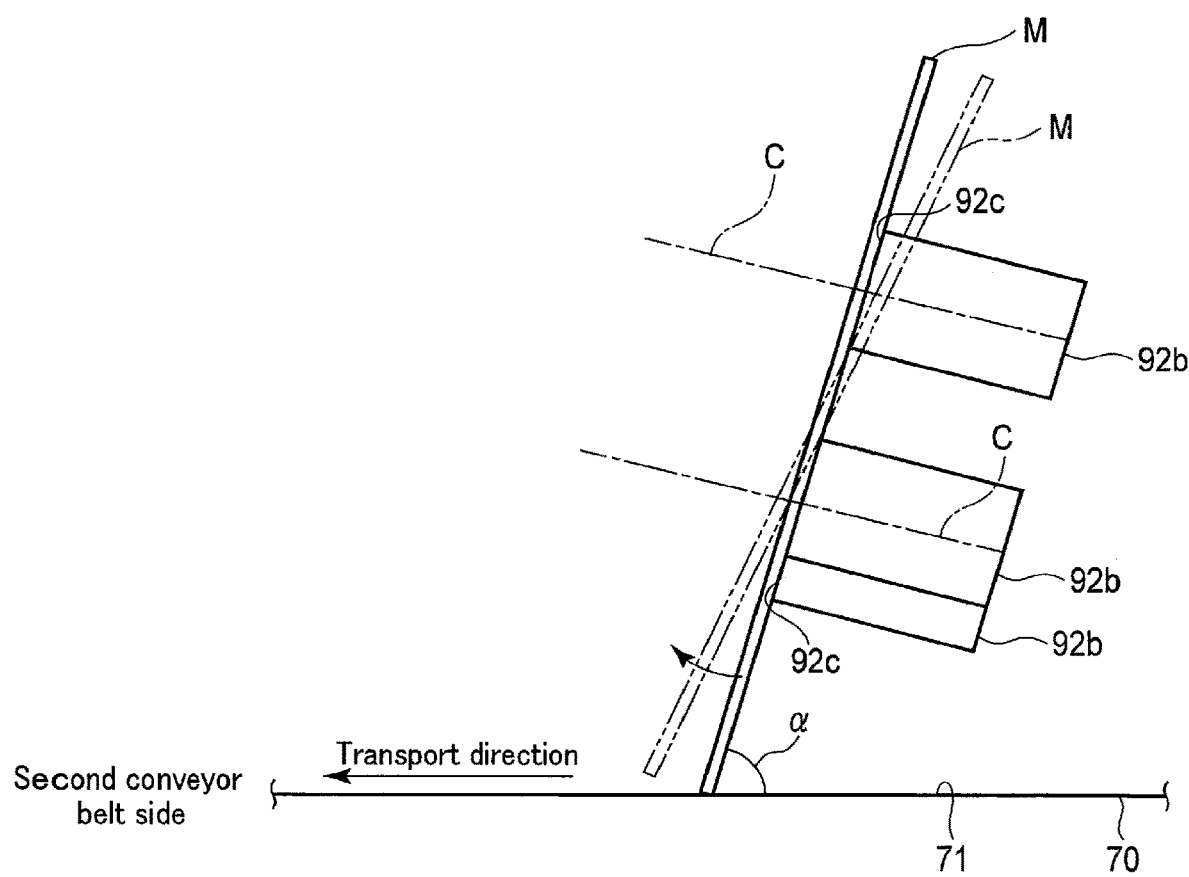
F I G. 16

PICKING SYSTEM

CROSS-REFERENCE TO RELATED APPLICATIONS

This application is a Continuation Application of PCT Application No. PCT/JP2018/034277, filed Sep. 14, 2018 and based upon and claiming the benefit of priority from prior Japanese Patent Application No. 2017-213244, filed Nov. 2, 2017, the entire contents of all of which are incorporated herein by reference.

FIELD

Embodiments described herein relate generally to a picking system for picking up a parcel from a placing section and selectively turning the parcel over.

BACKGROUND

A picking and postmarking system has been known for picking up and postmarking individual mail pieces. The picking and postmarking system of this type includes a postmarking system which holds and conveys a picked-up mail piece between belts by sliding the mail piece with the belts so that the mail piece can be postmarked at the transport destination.

A picking robot has also been known, which picks up parcels accumulated on a placing table or the like, one by one, and moves the picked-up parcel to another position.

BRIEF DESCRIPTION OF THE DRAWINGS

FIG. 4 is a front view of the conveyor device.

FIG. 11 is an explanatory diagram schematically showing a first orientation of the suction hand with respect to a mail piece when transporting the mail piece from the placing table to a recognition table used in the picking system.

FIG. 13 is an explanatory diagram schematically showing a first orientation of the suction hand with respect to a mail piece when transporting the mail piece from the placing table to a recognition table used in the picking system.

FIG. 14 is an explanatory diagram schematically showing a second orientation of the suction hand with respect to the mail piece when transporting the mail piece from the recognition table to the first conveyor belt.

FIG. 15 is an explanatory diagram schematically showing the orientation of the mail piece on the first conveyor belt.

FIG. 16 is an explanatory view schematically showing the state of the mail piece in contact with the transporting surface of the first conveyor belt.

DETAILED DESCRIPTION

According to the present embodiment, a picking system includes a suction device including a suction hand that has a suction unit configured to suction a transport target article by negative pressure, and a pump that exerts the negative pressure onto the suction unit; a moving device configured to move the suction hand from a placing unit on which the transport target article is placed to a transport target position, the moving device including a turning-over section configured to rotate the suction hand around an axis in a horizontal direction perpendicular to a gravity direction, from an orientation in which the suction unit faces down along the gravity direction and a suction surface of the suction unit intersects the gravity direction; and a control device configured to control the suction device and the moving device, wherein when it is determined, based on an image obtained by an imaging device that captures the transport target article, that the transport target article needs to be moved to the transport target position with a front side and back side of the transport target article turned over, the control device causes the suction unit to suction the transport target article, the moving device to transport the transport target article to a position above the transport target position, the turning-over section to set the suction hand to an orientation in which the transport target article is positioned above the suction unit and a direction substantially orthogonal to the suction surface is inclined with respect to the gravity direction, and the suction unit to release the suction of the transport target article.

Figure 1:
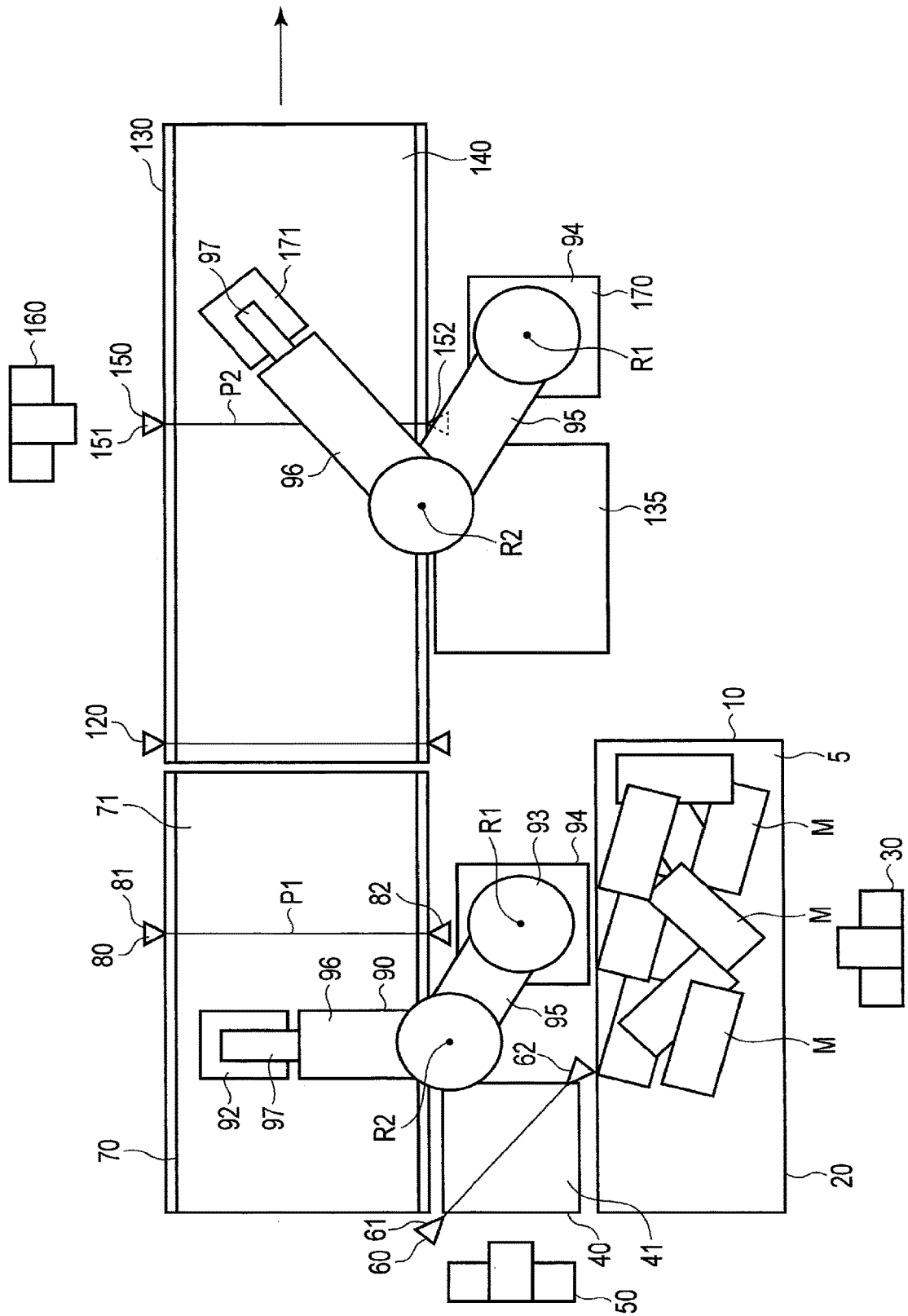
FIG. 1 is a plan view schematically showing a configuration of a picking and postmarking system according to one embodiment.
Figure 2:
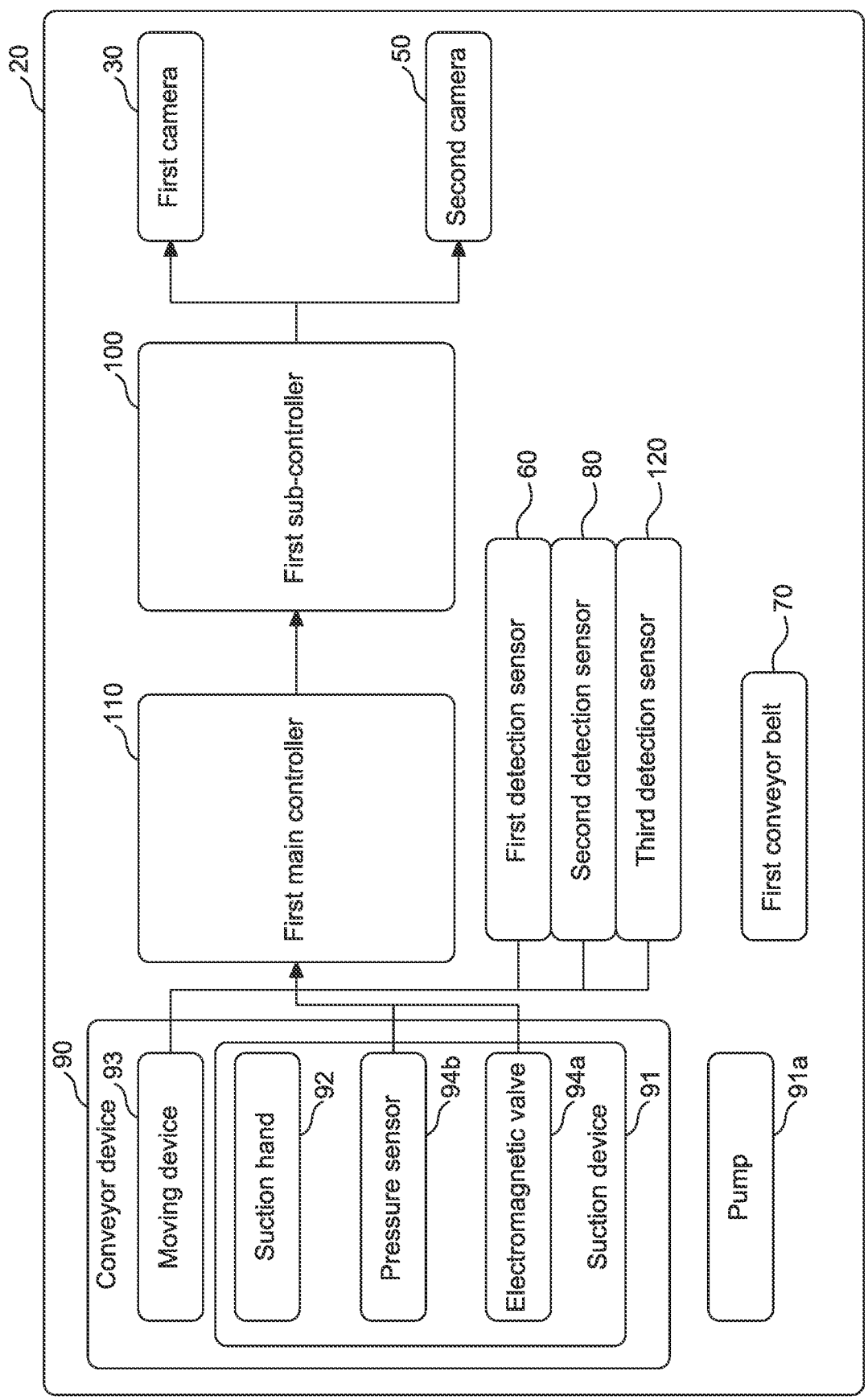
FIG. 2 is a block diagram showing the configuration of a picking system used in the picking and postmarking system.
Figure 3:
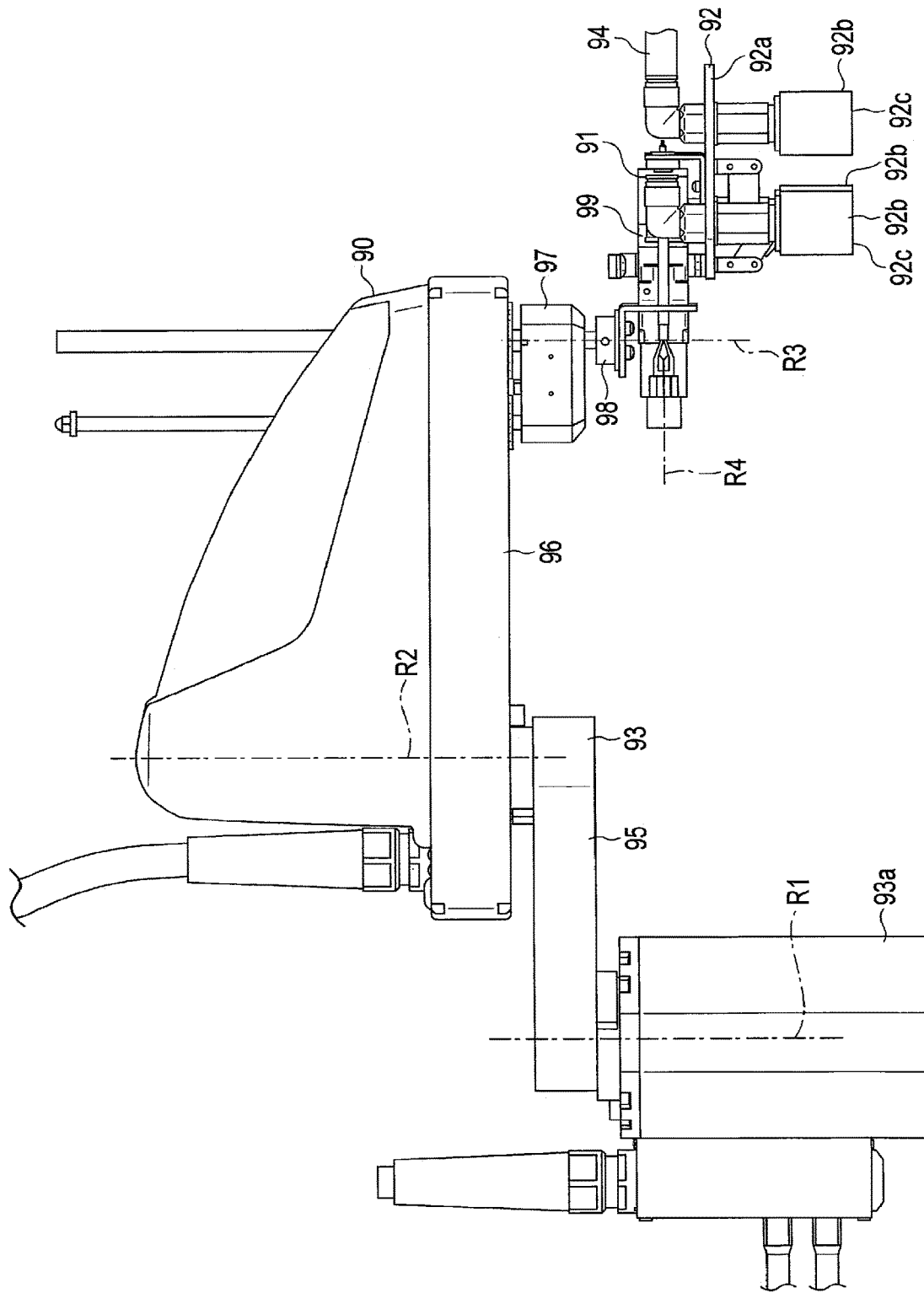
FIG. 3 is a side view of a conveyor device used in the picking system.
Figure 5:
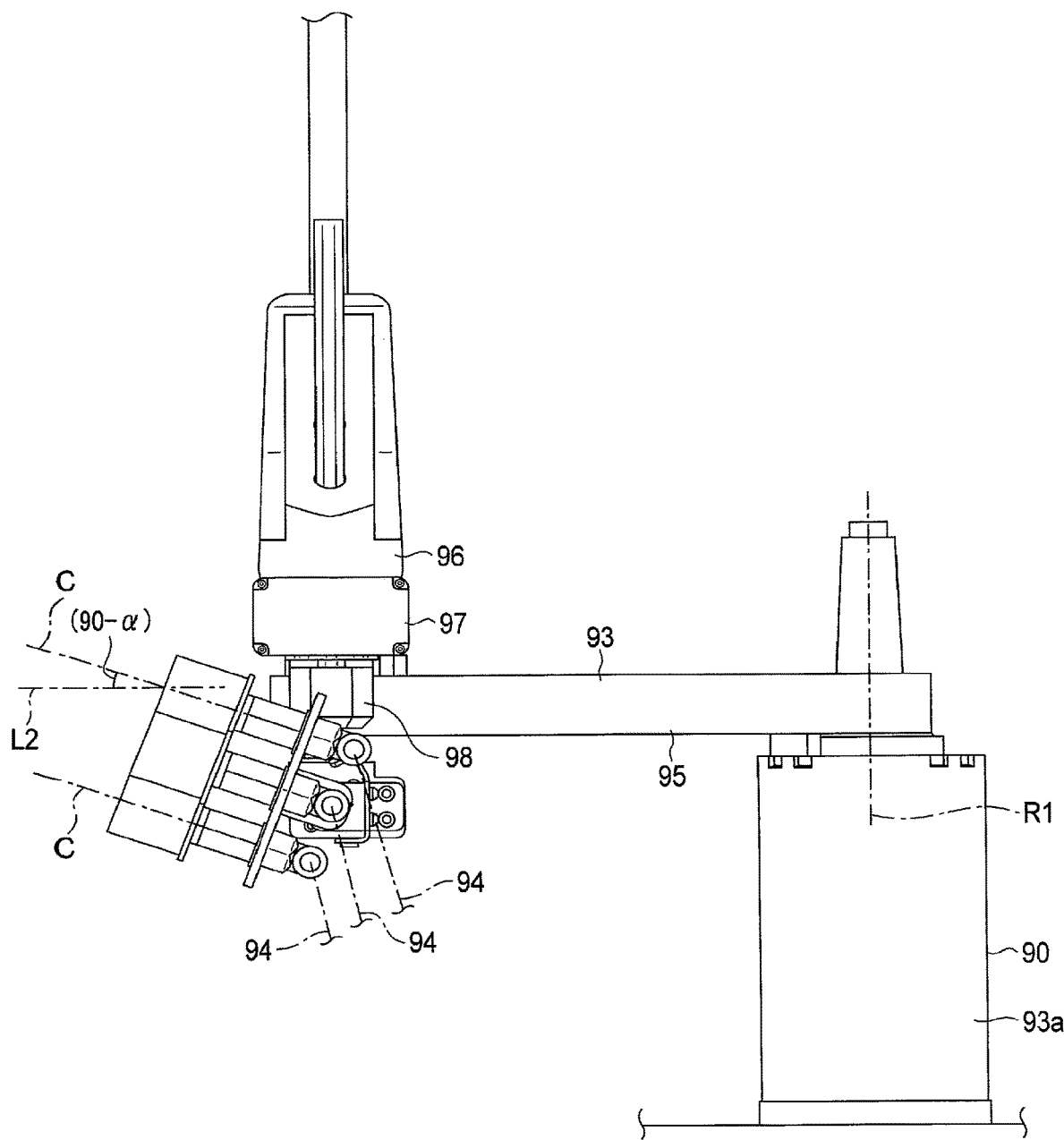
FIG. 5 is a front view of the conveyor device.

The picking and postmarking system 10 according to an embodiment will be described with reference to FIGS. 1 to 16. FIG. 1 is a plan view schematically showing the configuration of the picking and postmarking system 10. FIG. 2 is a block diagram showing the configuration of a picking system 20 used in the picking and postmarking system 10. FIG. 3 is a side view of a conveyor device 90 used in the picking system 20. FIG. 4 is a front view of the conveyor device 90. FIG. 5 is a front view of the conveyor device 90.

Figure 6:
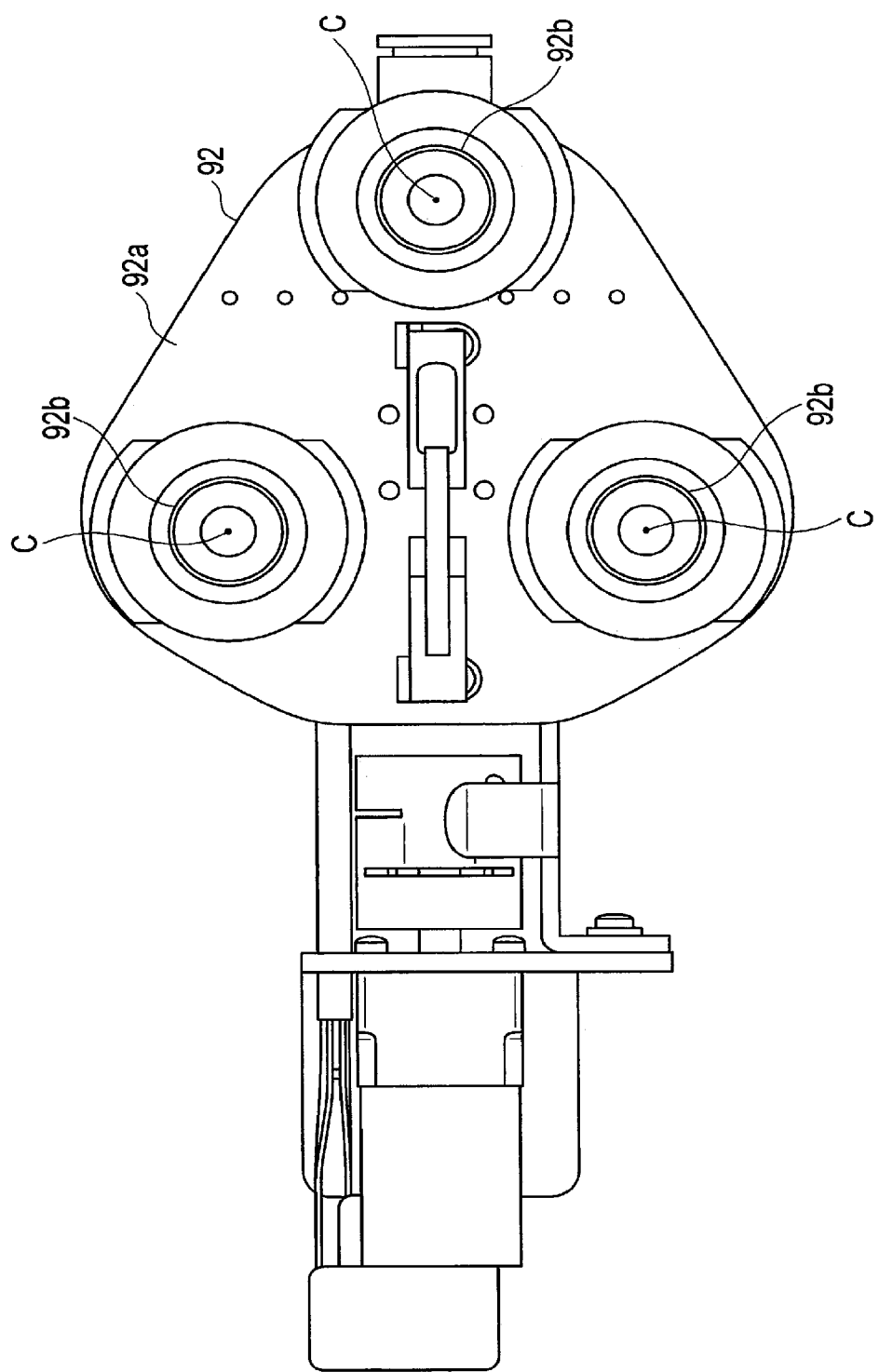
FIG. 6 is a view of a bottom surface of a suction hand used in the conveyor device.
Figure 7:
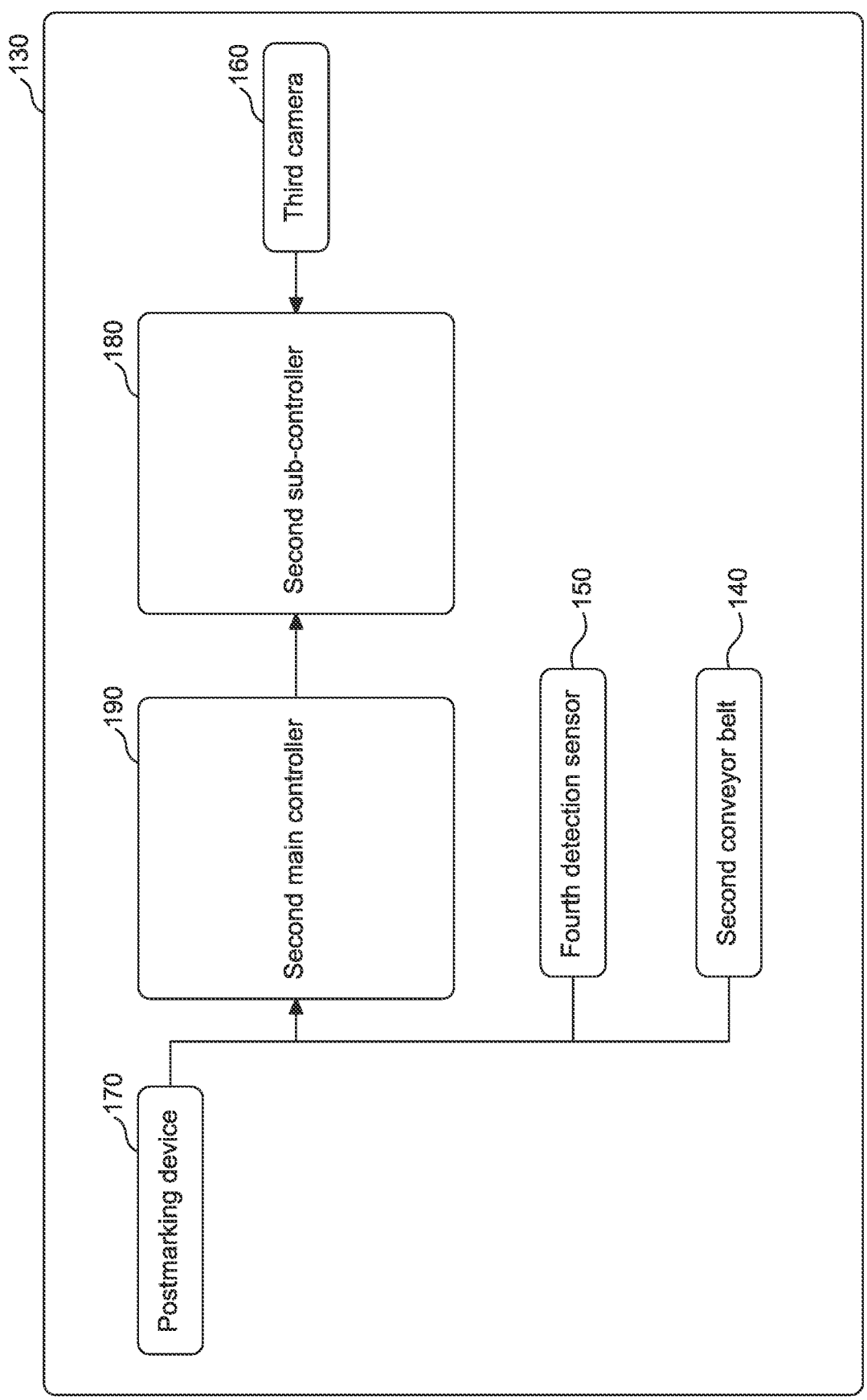
FIG. 7 is a block diagram showing a configuration of the postmarking system used in the picking and postmarking system.
Figure 8:
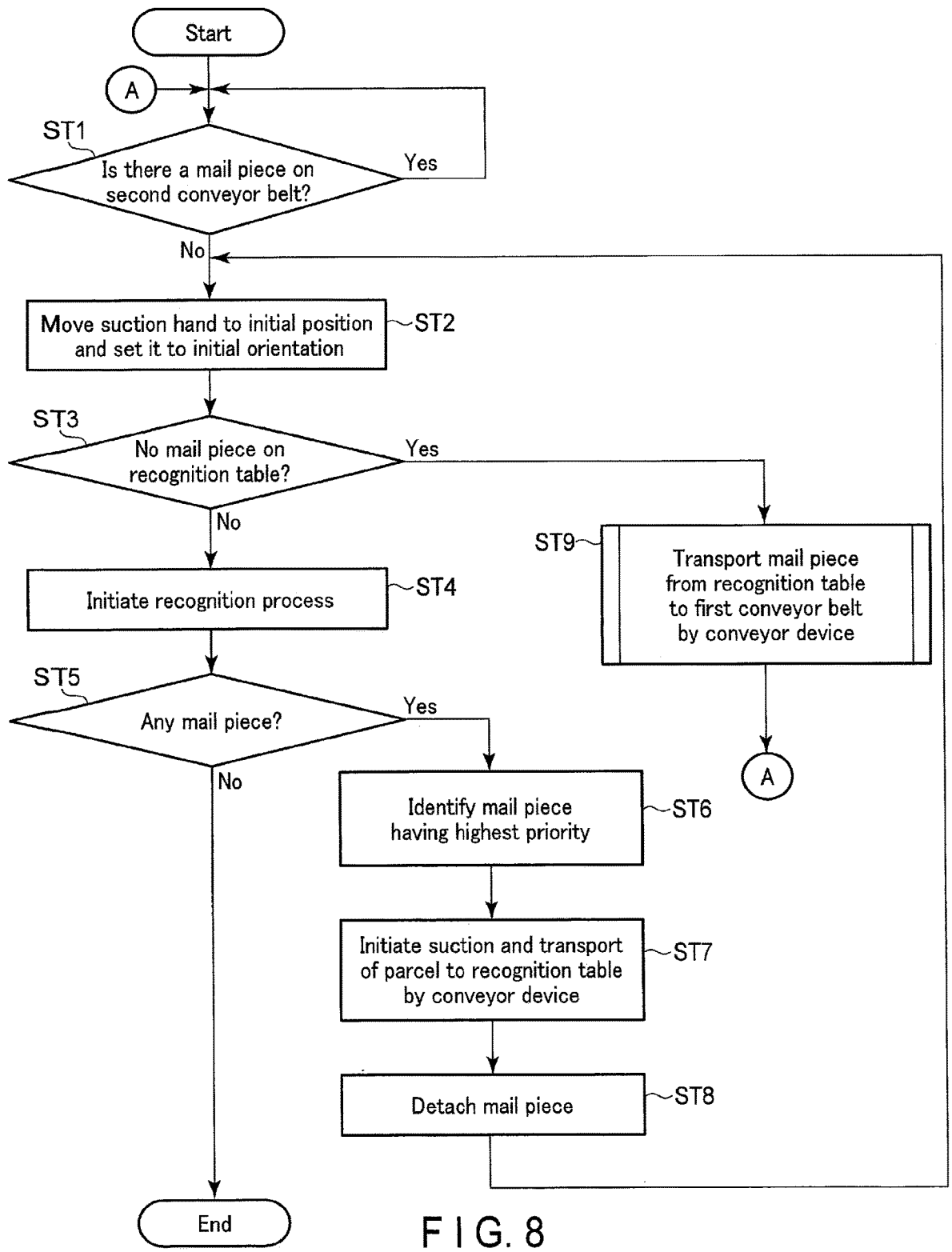
FIG. 8 is a flowchart showing an exemplary operation of the conveyor system.

FIG. 6 is a view of the bottom surface of a suction hand 92 used in the conveyor device 90. FIG. 7 is a block diagram showing the configuration of a postmarking system 130 used in the picking and postmarking system 10. FIG. 8 is a flowchart showing an exemplary operation of picking up a mail piece M using the picking system 20.

Figure 9:
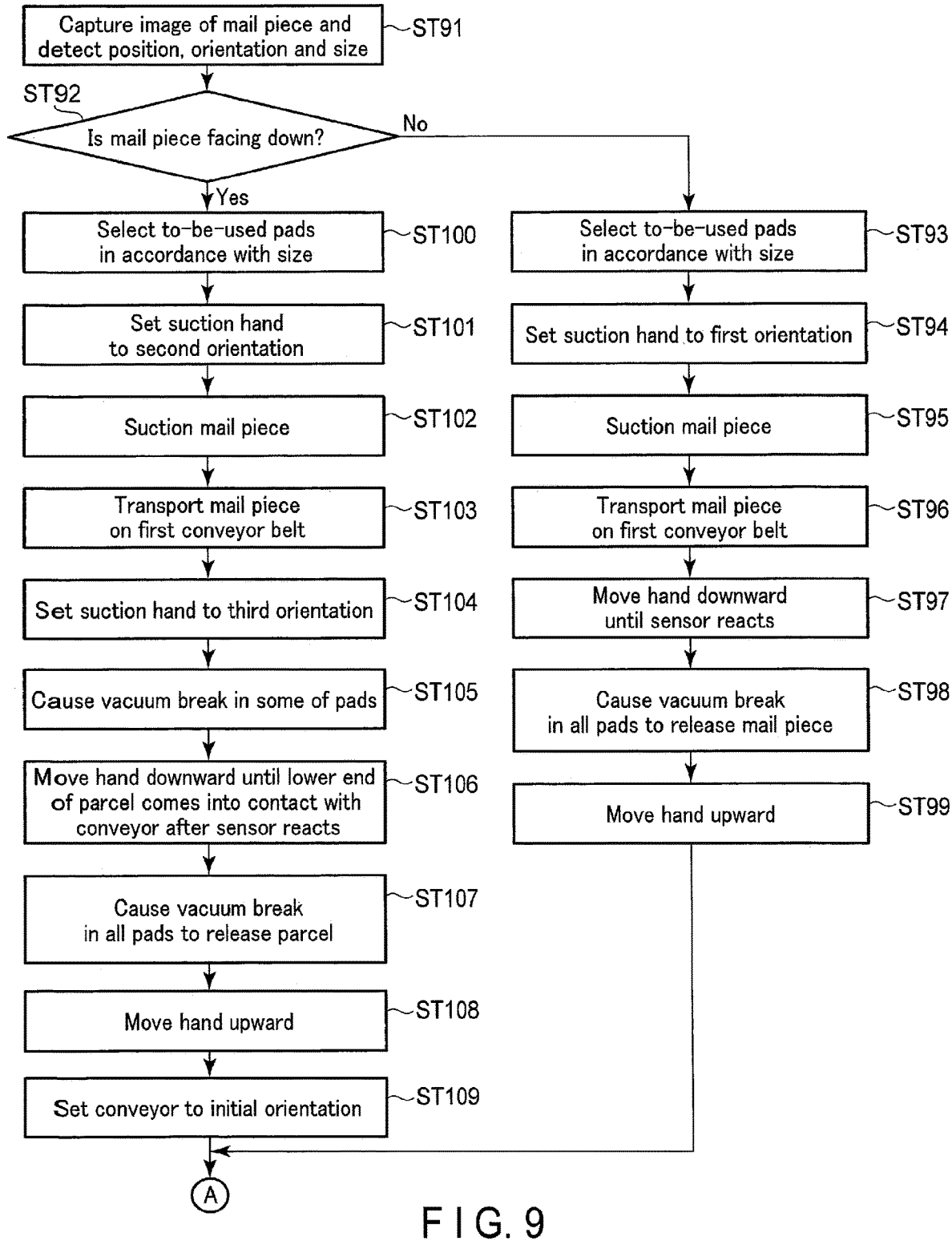
FIG. 9 is a flowchart showing an exemplary mail turning-over operation using the picking system.
Figure 10:
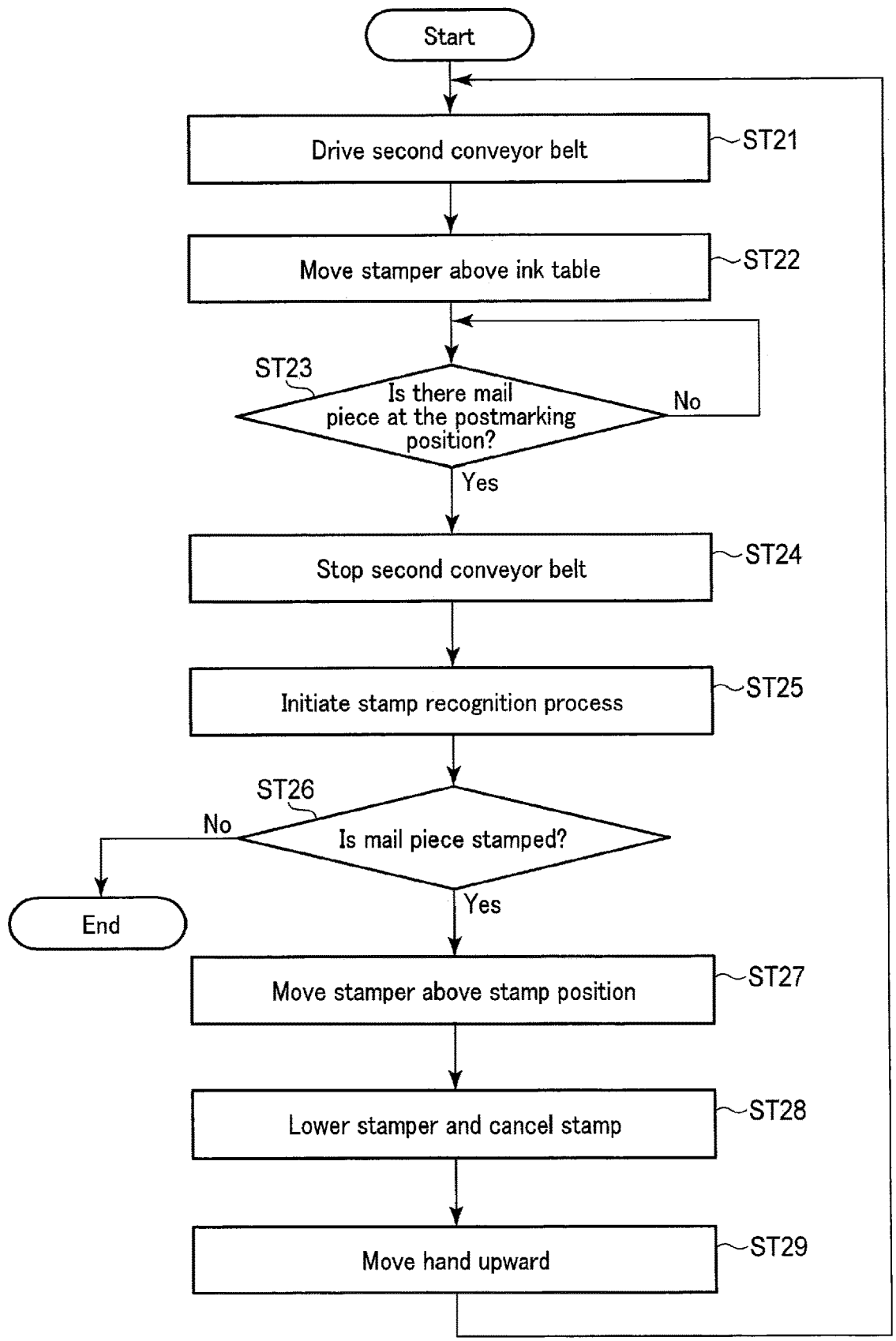
FIG. 10 is a flowchart showing an exemplary postmarking operation using the postmarking system.
Figure 12:
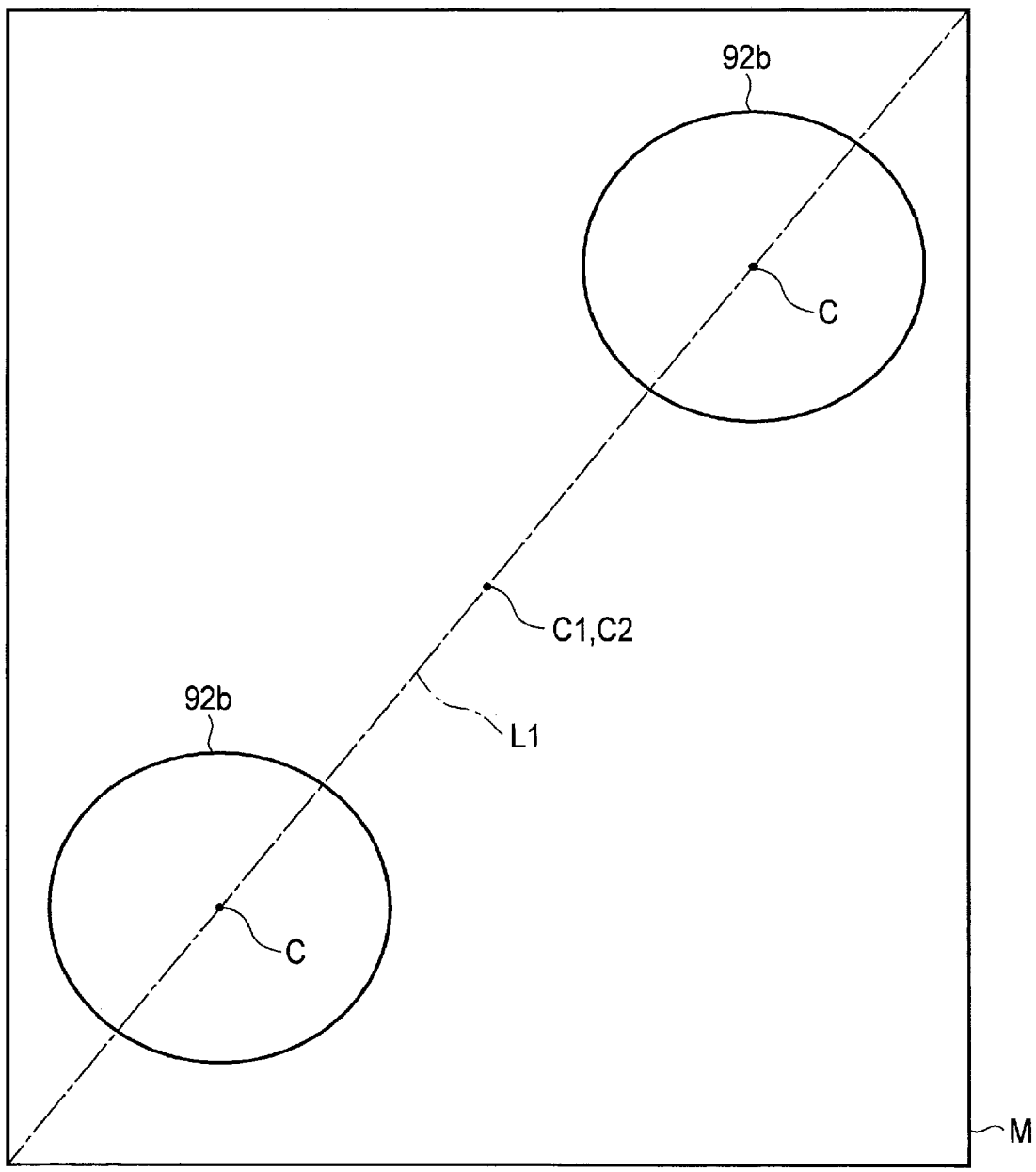
FIG. 12 is an explanatory diagram schematically showing a first orientation of the suction hand with respect to a mail piece when transporting the mail piece from the placing table to a recognition table used in the picking system.

FIG. 9 is a flowchart showing an exemplary operation of turning the mail piece M using the picking system 20. FIG. 10 is a flowchart showing an exemplary postmarking operation using the postmarking system 130. FIGS. 11 to 13 are explanatory diagrams schematically showing a first orientation of the suction hand 92 with respect to the mail piece M when transporting the mail piece M from the placing table 5 to the recognition table. FIG. 14 is an explanatory diagram schematically showing a second orientation of the suction hand 92 with respect to the mail piece M when transporting the mail piece M from the recognition table 40 to the first conveyor belt 70. FIG. 15 is an explanatory diagram schematically showing the orientation of the mail piece M on the transporting surface 71 of the first conveyor belt 70. FIG. 16 is an explanatory diagram schematically showing a state of the mail piece M in contact with the transporting surface 71.

As shown in FIGS. 1 and 2, the picking and postmarking system 10 includes a picking system 20 for picking up a mail piece M from a placing table 5, which is an example of a placing section on which mail pieces M are placed, and a postmarking system 130 for postmarking the mail piece M picked up by the picking system 20. The picking and postmarking system 10 may be used, for example, in a post office. The mail piece M is an example of an article to be picked up by the picking system 20 and transported to the transport destination. The mail piece M may be a postcard or an envelope.

The picking system 20 includes: a first camera 30 for capturing an image of mail pieces M placed on the placing table 5; a recognition table 40, on which a mail piece M can be placed; a second camera 50 for capturing an image of the mail piece M placed on a placing surface 41 of the recognition table 40; a first detection sensor 60 for detecting whether or not the mail piece M is placed on the recognition table 40; a first conveyor belt 70; and a second detection sensor 80 for detecting whether or not the mail piece M is positioned at a predetermined height with respect to a release position P1 for releasing the mail piece M on the first conveyor belt 70.

Moreover, the picking system 20 further includes a conveyor device 90 for transporting the mail piece M from the placing table 5 to the placing surface 41 of the recognition table 40 and further transporting the mail piece M from the recognition table 40 to the first conveyor belt 70; a first sub-controller 100 for driving the first conveyor belt 70 and the conveyor device 90; and a first main controller 110.

Furthermore, the picking system 20 has a third detection sensor 120 for detecting whether or not there is a mail piece M at an upstream end of a second conveyor belt 140, which will be described later, of the postmarking system 130.

The first camera 30 can capture images in a such manner that the first main controller 110 can identify a mail piece M having the highest picking priority of the conveyor device 90 picking up one of a plurality of mail pieces M placed on the placing table 5.

The mail piece having the highest priority in the present embodiment may be the mail piece placed at the highest position among the mail pieces M placed on the placing table 5. For this reason, a 3D camera may be used as an example of the first camera 30 in order for the first main controller 110 to identify a mail piece M placed at the highest position. The first camera 30 may be a color camera.

The recognition table 40 has a placing surface 41, on which a mail piece M can be placed. The placing surface 41 is a horizontal plane orthogonal to the direction of gravity. In the present embodiment, the vertical direction is defined by determining the direction of gravity action as the downward direction. The placing surface 41 has an area on which at least one mail piece M can be placed.

The second camera 50 is configured to capture images in such a manner that the first main controller 110 can determine whether or not the mail piece M on the placing surface 41 is placed face up. The second camera 50 is, for example, a color camera. In the present embodiment, the face-up position indicates the stamped surface (front surface) facing up.

The first detection sensor 60 may be, for example, a transmission-type photosensor. The first detection sensor 60 includes a phototransmitter 61 and a photoreceiver 62. The phototransmitter 61 is arranged on one edge of the placing surface 41. The phototransmitter 61 is configured to emit light in such a manner that the light passes through the center of the placing surface 41. The photoreceiver 62 is arranged on one edge of the placing surface 41 at a position facing the phototransmitter 61.

The first conveyor belt 70 is arranged at a position adjacent to the second conveyor belt 140, which will be described later, in the postmarking system 130. The running direction of the first conveyor belt 70 is a direction toward the second conveyor belt 140. In one example of the present embodiment, the running direction of the first conveyor belt 70 is a one-way direction. In another example, the first conveyor belt 70 may be configured to change its running direction to the opposite direction.

The second detection sensor 80 is, for example, a transmission-type photosensor. The second detection sensor 80 includes a phototransmitter 81 and a photoreceiver 82. The phototransmitter 81 is arranged at a predetermined height with respect to the transporting surface 71, at one end of the width direction of the first conveyor belt 70, where the width direction includes a release position P1. The width direction of the first conveyor belt 70 is a direction orthogonal to the running direction of the first conveyor belt 70.

The predetermined height is a height that would not cause any damage to a mail piece M even if the mail piece M falls onto the transporting surface 71 from this height. The photoreceiver 82 is arranged at the other end of the width direction of the first conveyor belt 70 including the release position P1.

As shown in FIGS. 3 to 6, the conveyor device 90 includes a suction device 91 for sucking a mail piece M under a negative pressure, and a moving device 93 for moving a suction hand 92 used in the suction device 91.

As shown in FIG. 6, the suction device 91 includes a suction hand 92 arranged on the moving device 93, a pump 91a (shown in FIG. 2), and pipes 94 (shown in FIG. 3) connected to the pump 91a. The suction hand 92 includes a base 92a and suction pads 92b provided in the base 92a. The base 92a may be, for example, formed into a plate.

A suction pad 92b is cylindrical, suctioning a mail piece M through an opening end thereof. The suction pad 92b may be made of, for example, a resin such as rubber. The suction pad 92b may be shaped, for example, into cylindrical bellows so that the suction pad 92b can be slightly shortened in its axial direction when suctioning the mail piece M under negative pressure.

A plurality of suction pads 92b may be provided, and in the present embodiment, three suction pads 92b are provided as an example. The three suction pads 92b are arranged at positions such that their center lines C run through the respective corners of a triangle. In one example of the present embodiment, the center lines C of the three suction pads 92b are arranged at positions that run through the respective corners of an equilateral triangle. The center lines C are straight lines. In another example, the center lines C of the three suction pads 92b may be arranged at positions that run through the corners of a triangle that is not an equilateral triangle.

The tip surface of a suction pad 92b is a suction surface 92c that comes into contact with a mail piece M when suctioning the mail piece M. The suction surfaces 92c of all the suction pads 92b are arranged on the same plane. The suction surfaces 92c form a plane orthogonal to the center lines (center axes) of the suction pads 92b.

In the present embodiment, the three suction pads 92b have a positional relationship, as shown in FIG. 14, such that the center lines C of the three suction pads 92b are arranged at vertically different positions with respect to each other when a fourth rotation axis R4 of a turning-over section 99 of the conveyor device 90, which will be described later, is parallel to the width direction of the first conveyor belt 70, and when the suction hand 92 is in an orientation such that the suction surfaces 92c are orthogonal to the horizontal direction. The horizontal direction is perpendicular to the gravity direction, or in other words, perpendicular to the vertical direction.

In the present embodiment, with the suction pads 92b each formed in a cylindrical shape, the center lines C of the three suction pads 92b run parallel to the horizontal direction when the fourth rotation axis R4 of the turning-over section 99 of the conveyor device 90 is parallel to the width direction of the first conveyor belt 70, and when the orientation of the suction hand 92 is such that the suction surface 92c is orthogonal to the horizontal direction.

In one example of the present embodiment, three suction pads 92b are provided in order to suction and stably carry various possible types of mail pieces M. The number of suction pads 92b, however, is not limited to three. The number of suction pads 92b can be suitably changed in accordance with the size of the suction pads 92b and the size of the targeted transport article.

The pump 91a is connected to each suction pad 92b by way of the pipe 94. Each pipe 94 is provided with an electromagnetic valve 94a, which is an example of a valve for switching between a state of the pipe 94 communicating with the atmosphere and a closed state. When the pump 91a is driven with the electromagnetic valve 94a in a closed state, a negative pressure is generated on the suction pad 92b. When the pump 91a is stopped from being driven and the electromagnetic valve 94a is opened, the interior pressure of the suction pad 92b becomes equal to the atmospheric pressure, thereby attaining a so-called vacuum break. The opening and closing of the electromagnetic valve 94a of each pipe 94 is independently conducted by the first main controller 110.

Each pipe 94 is further provided with a pressure sensor 94b. The pressure sensor 94b is configured to detect the pressure inside the pipe 94. The detection result obtained by the pressure sensor 94b is transmitted to the first main controller 110.

The suction hand 92 is fixed to the moving device 93. The moving device 93 is provided with functions 1 to 7.

Function 1 is to move the suction hand 92 horizontally and vertically within the range of the placing table 5, with the suction pad 92b facing down.

Function 2 is to bring the orientation of the suction hand 92 into the first orientation with respect to the mail piece M within the range of the placing table 5. The first orientation is determined as an orientation in which, when multiple suction pads 92b are adopted, the center C1 of these suction pads 92b faces the center C2 of the mail piece M, and the suction pads 92b are symmetrically arranged with respect to a line L1 defined on the mail piece M. As one example of the present embodiment, the line L1 is a diagonal line on the mail piece M.

When three suction pads 92b are adopted as shown in FIG. 11, the first orientation is determined as an orientation in which the center C1 between the three suction pads 92b faces the center C2 of the mail piece M. Furthermore, with the line L1 being a diagonal line on the mail piece M in the present embodiment, the first orientation is such that the center C1 of one of the suction pads 92b is arranged on the line L1.

When two suction pads 92b are adopted as shown in FIG. 12, the first orientation is such that the center C1 between the two suction pads 92b faces the center of the mail piece M, and the center line C of each of the suction pads 92b falls on the line L1. When one suction pad 92b is adopted as shown in FIG. 13, the first orientation is such that the center line C of the suction pad 92b falls on the center C2 of the mail piece M.

In the present embodiment, a diagonal line is adopted as an example of the line L1 defined on the mail piece M, but the present invention is not limited thereto. As a different example, when the mail piece M is rectangular, the line L1 may pass through the center C2 of the mail piece M and be parallel to its longitudinal direction.

Function 3 is to move the suction hand 92 from the placing table 5 to the recognition table 40.

Function 4 is to move the suction hand 92 up and down within the range of the placing surface 41 of the recognition table 40, with the openings of the suction pads 92b facing down.

Function 5 is to bring the suction hand 92 to the second orientation with respect to the mail piece M. The second orientation is determined as an orientation in which, when multiple suction pads 92b are in actual use, the approximate center of the in-use suction pads 92b faces the approximate center of the mail piece M. The approximate center here refers to the center and a position in the proximity of the center. That is, the center is not limited to the exact center. In other words, although the preferable orientation is such that the center of the in-use suction pads 92b faces the center of the mail piece M, a deviation may occur depending on the movement accuracy of the moving device 93 or the accuracy of identifying the position of the center of the mail piece M based on an image captured by the second camera 50, no matter how the moving device 93 is driven to bring the centers to face each other. The orientation in which the approximate center of the in-use suction pads 92b faces the approximate center of the mail piece M includes such a deviation. With the center of the in-use suction pads 92b facing the center of the mail piece M, at least one of the suction pads 92b is positioned on one side of the mail piece M with respect to the center C2, while the center C1 of at least one of the suction pads 92b is positioned on the other end side in the opposite direction with respect to the center C2 of the mail piece M.

In the present embodiment, when three or more suction pads 92b are adopted, or in other words, when suction is performed by three or more suction pads 92b, the center C1 between the three suction pads 92b faces the center C2 of the mail piece M, and one of the suction pads 92b is positioned on one side in the longitudinal direction with respect to the center C2 of the mail piece M, while the center C1 between the remaining two suction pads 92b is positioned on the other side in the longitudinal direction with respect to the center C1 of the mail piece M.

When two suction pads 92b are adopted, or in other words, when suction is performed by two suction pads 92b, the second orientation is such that the center C1 between the two suction pads 92b faces the center C2 of the mail piece M, and one of the suction pads 92b is positioned on one side in the longitudinal direction with respect to the center C2 of the mail piece M, while the center C1 of the other suction pad 92b is positioned on the other side in the longitudinal direction with respect to the center C2 of the mail piece M.

In the present embodiment, the positional relationship between the three suction pads 92b is, as shown in FIG. 14, such that, with the fourth rotation axis R4 of the turning-over section 99 of the conveyor device 90, which will be described later, being parallel to the width direction of the first conveyor belt 70, and with the suction hand 92 being in the orientation of the suction surfaces 92c of the three suction pads 92b that are orthogonal to the horizontal direction, the center lines C of the three suction pads 92b are vertically shifted from one another. For this reason, by adjusting the position of the suction hand 92 with respect to the mail piece M while maintaining the orientation of the fourth rotation axis R4 of the turning-over section, which will be described later, in parallel to the width direction of the mail piece M, the orientation of the suction hand 92 can be brought to the second orientation.

That is, in the second orientation, when three suction pads 92b are adopted, the positional relationship of the three suction pads 92b with respect to the mail piece M is as shown in FIG. 14. If two suction pads 92b are to be used, the second orientation can be obtained by selecting two of the three suction pads 92b, and bringing the center of these two suction pads 92b to face the center of the mail piece M. The two suction pads 92b to be selected are predetermined. If one suction pad 92b is to be used, the second orientation is obtained by bringing the center of this to-be-used suction pad 92b to face the center of the mail piece M. The to-be-used suction pad 92b is predetermined. As described above, by moving the three suction pads 92b simply from the position of FIG. 14 in parallel in the plane direction of the mail piece M, the second orientation for using two suction pads 92b and the second orientation for using one suction pad 92b can be attained.

The width direction of the mail piece M represents a direction parallel to the shorter side direction of the mail piece M if the mail piece M has a rectangular shape with one side longer in one direction. If the planar shape of the mail piece M is a square, the width direction refers to a direction parallel to any one of the four sides of the mail piece M.

As discussed above, in the present embodiment, when the suction hand 92 is in the second orientation, the fourth rotation axis R4 of the turning-over section 99 is parallel to the width direction of the mail piece M.

The second orientation with one suction pad 92b in use is such that the center line C of this suction pad 92b passes through the center C2 of the mail piece M.

Function 6 is to move the suction hand 92 from the recognition table 40 to a position above the release position P1 of the first conveyor belt 70.

Function 7 is to rotate the suction hand 92, as shown in FIG. 5, from the orientation in which the suction surfaces 92c of the suction pads 92b is orthogonal to the horizontal direction to the orientation in which the angle formed between the line orthogonal to the suction surface 92c and the horizontal line L2 reaches a predetermined angle, (90-α) degrees, where α is a value of 90 degrees or less. One example of the line orthogonal to the suction surface 92c is the center line C of the suction pad 92b in the present embodiment.

The angle α is defined between the extended surface of the mail piece M and the transporting surface 71 of the first conveyor belt 70 when placing the mail piece M on the transporting surface 71, and α is preset in order to smoothly place the mail piece M on the transporting surface 71. An example of α is 80 degrees.

To achieve functions 1 to 7, a SCARA robot may be used as an example of the moving device 93. As shown in FIGS. 1 and 3 to 5, the moving device 93 includes a base section 93a, a shoulder section 95, an arm section 96 supported by the shoulder section 95, a vertical movement section 97 supported by the arm section 96, a rotation section 98 supported by the vertical movement section 97, and a turning-over section 99 supported by the rotation section 98.

The base section 93a is fixed to the floor surface or the like of the installation site where the picking and postmarking system 10 is installed. The base section 93a may be movably configured with wheels or the like.

The shoulder section 95 has, for example, a predetermined length in the horizontal direction. One end of the shoulder section 95 is supported by the base section 93a in a rotatable manner around a first rotation axis R1, which is parallel to the vertical direction. The shoulder section 95 may be rotatable, for example, 360 degrees in two directions. The shoulder section 95 can be independently rotated by an actuator such as an electric motor. The position of the shoulder section 95 is detected by a sensor, and the amount of movement of the shoulder section 95 is controllable.

One end of the arm section 96 is provided at the other end of the shoulder section 95 in a rotatable manner in two directions around a second rotation axis R2, which is parallel to the vertical direction. The arm section 96 may be rotatable, for example, 360 degrees in two directions. The arm section 96 is independently rotatable by an actuator such as an electric motor. The position of the arm section 96 is detected by a sensor, and the amount of movement of the arm section 96 is controllable.

The vertical movement section 97 is supported by the other end of the arm section 96. The vertical movement section 97 is vertically movable with respect to the arm section 96. The vertical movement section 97 is independently movable by an actuator such as an electric motor. The position of the vertical movement section 97 is detected by a sensor, and the amount of movement of the vertical movement section 97 is controllable.

The rotation section 98 is provided at the lower end of the vertical movement section 97. The rotation section 98 is rotatable in two directions around a third rotation axis R3, which is parallel to the vertical direction. The rotation section 98 may be rotatable, for example, 360 degrees in two directions. The rotation section 98 is independently rotatable by an actuator such as an electric motor. The rotational position of the rotation section 98 is detected by a sensor, and the rotation amount of the rotation section 98 is controllable.

As shown in FIGS. 3 to 5, the turning-over section 99 is provided on the rotation section 98 in a rotatable manner in two directions around a fourth rotation axis R4, which is parallel to the horizontal direction. The turning-over section 99 therefore rotates together with the rotation section 98 in the present embodiment. The turning-over section 99 is configured to rotate the suction hand 92 around the fourth rotation axis R4 from the orientation in which the suction pads 92b face down with the suction surfaces 92c substantially orthogonal to the vertical direction. Here, the substantially orthogonal orientation may include an orthogonal orientation and nearly orthogonal orientation. That is, the orientation is not limited to a precisely orthogonal orientation. Depending on the moving accuracy of the moving device 93, even if the turning-over section 99 is driven to bring the suction surfaces 92c into the orientation orthogonal to the vertical direction, there may be a slight displacement. A substantially orthogonal orientation allows for such a displacement. The turning-over section 99 may be rotatable, for example, 360 degrees in two directions. In addition, the turning-over section 99 is independently rotatable by an actuator such as an electric motor. The rotational position of the turning-over section 99 is detected by a sensor, and the amount of rotation of the turning-over section 99 is controllable.

The first sub-controller 100 may include, for example, a processor and storage medium. The processor may be configured with one or more integrated circuits.

The first sub-controller 100 controls the operations of the conveyor device 90 and the first conveyor belt 70 in accordance with an instruction from the first main controller 110.

The third detection sensor 120 is arranged at an upstream end of the second conveyor belt 140, which will be described later, of the postmarking system 130 to detect whether or not a mail piece M is placed at the upstream end of the second conveyor belt 140. The third detection sensor 120 may be, for example, a transmission-type photosensor.

The first main controller 110 may include, for example, a processor and storage medium. The processor may be configured with one or more integrated circuits.

The first main controller 110 determines whether or not a mail piece M is placed on the placing table 5 based on an image captured by the first camera 30. The first main controller 110 further identifies, based on the image captured by the first camera 30, the mail piece M that has the highest priority for transporting to the recognition table 40 among the mail pieces M placed on the placing table 5.

Furthermore, the first main controller 110 detects the horizontal position and the vertical position of the center C2 of the identified mail piece M. The first main controller 110 also determines whether or not a mail piece M is placed on the placing surface 41 of the recognition table 40, based on the detection result of the first detection sensor 60. The first main controller 110 further detects the center position of the mail piece M placed on the placing surface 41, based on the image captured by the second camera 50.

As shown in FIGS. 1 and 7, the postmarking system 130 includes an ink table 135, a second conveyor belt 140, a fourth detection sensor 150 provided on the second conveyor belt 140, a third camera 160, a postmarking device 170 for postmarking a mail piece M, a second sub-controller 180 for driving the second conveyor belt 140 and the postmarking device 170, and a second main controller 190.

On the ink table 135, refill ink is provided for a postmark stamper. The ink table 135 may be omitted if there is no need to refill the ink of the stamper.

The second conveyor belt 140 is arranged downstream of the first conveyor belt 70. The second conveyor belt 140 is arranged to create a clearance between the first conveyor belt 70 in a manner such that the mail piece M would not fall between them. The second conveyor belt 140 transports the postmarked mail pieces M to a predetermined transport destination. The predetermined transport destination may be, for example, a box for containing the postmarked mail pieces M.

The fourth detection sensor 150 is configured to detect whether or not a mail piece M is placed at a postmarking position P2 defined on the second conveyor belt 140. The postmarking position P2 is preset. The fourth detection sensor 150 is, for example, a transmission-type photosensor. The phototransmitter 151 of the fourth detection sensor 150 is arranged at one end of the width direction including the postmarking position P2 across the second conveyor belt 140. The photoreceiver 152 of the fourth detection sensor 150 is arranged at the other end of the width direction including the postmarking position P2.

The third camera 160 is configured to capture the image of the postmarking position P2 from above. The third camera 160 captures an image in such a manner that the second main controller 190 can detect the horizontal position and the vertical position of a stamp on the mail piece M. The third camera 160 is, for example, a 3D camera.

The postmarking device 170 includes a postmarking hand 171 to which a postmarking stamper is fixed. The postmarking device 170 is configured to postmark a mail piece M placed at the postmarking position P2. The postmarking device 170 is provided with functions 8, 9 and 10.

The function 8 is to vertically move the stamper above the ink table 135.

Function 9 is to move the stamper from the ink table 135 to a position above the stamp of the mail piece M placed on the postmarking position P2 of the second conveyor belt 140.

Function 10 is to vertically move the stamper above the stamp.

In order to achieve the functions 8 to 10, the postmarking device 170 may be provided, for example, with the same configuration as the moving device 93. The components of the postmarking device 170 having the same functions as those of the moving device 93 are denoted by the same reference numerals as in the moving device 93, and description thereof is omitted.

The second sub-controller 180 may include, for example, a processor and storage medium. The processor may be configured with one or more integrated circuits.

The second sub-controller 180 drives the second conveyor belt 140 and the postmarking device 170.

The second main controller 190 may include, for example, a processor and storage medium. The processor may be configured with one or more integrated circuits.

The second main controller 190 determines whether or not a mail piece M is placed at the postmarking position P2, based on the detection result of the fourth detection sensor 150. The second main controller 190 further detects the positions of the stamp on the mail piece M in the horizontal direction and in the vertical direction, based on the image captured by the third camera 160.

Next, the operation of the picking system 20 will be explained. First, as shown in FIG. 8, the first main controller 110 determines whether or not the processing is tied up in the postmarking system 130. As an example of this in the present embodiment, the first main controller 110 may determine whether or not a mail piece M is present at the upstream end of the second conveyor belt 140, based on the detection result of the third detection sensor 120 provided on the second conveyor belt 140 (step ST1).

If a mail piece M is present (yes at step ST1), it is assumed that there may be a problem in the second conveyor belt 140, the mail piece M may be caught between the first conveyor belt 70 and second conveyor belt 140, or the mail piece M may be jammed in the second conveyor belt 140. In any of these cases, the first main controller 110 determines that no mail piece M can be fed to the postmarking system 130.

When the first main controller 110 determines that no mail piece M is present at the upstream end of the second conveyor belt 140 (no at step ST1), the first main controller 110 moves the suction hand 92 to the initial position and sets it to the initial orientation (step ST2). The initial position may be, for example, a position above the release position P1 of the first conveyor belt 70.

When the suction hand 92 moves to the initial position and assumes the initial orientation, the first main controller 110 determines whether or not a mail piece M is present on the placing surface 41 of the recognition table 40, based on the image captured by the second camera 50. If the first main controller 110 determines that there is no mail piece M (no at step ST3), the first main controller 110 initiates a recognition process of the mail piece on the placing table 5, based on the image captured by the first camera 30 (step ST4).

The first main controller 110 determines whether or not a mail piece M is present on the placing table 5, based on the image captured by the first camera 30 (step ST5). When it is determined that there is no mail piece M on the placing table 5 (no at step ST5), the first main controller 110 terminates the operation of the picking system 20.

When it is determined that a mail piece M is present on the placing table 5 (yes at step ST5), the first main controller 110 identifies the mail piece having the highest selection priority as the next target selection item, based on the image captured by the first camera 30. In the present embodiment, for example, the mail piece M placed at the highest position is determined as the next target selection mail piece (step ST6).

The first main controller 110 controls the first sub-controller 100 to drive the conveyor device 90, thereby initiating the transport operation of picking up the identified mail piece M from the placing table 5 and transporting it to the placing surface 41 of the recognition table 40 (step ST7).

For example, as shown in FIGS. 11 to 13, the first main controller 110 determines the positions of the center C2 of the determined mail piece M in the horizontal direction and in the vertical direction, based on the image captured by the first camera 30, and further detects the line L1 from the identified mail piece M.

The first main controller 110 determines the suction pads 92b to be used among the three suction pads 92b in accordance with the size of the identified mail piece M. The first main controller 110 determines the first orientation of the suction hands 92 with respect to the identified mail piece M as illustrated in FIGS. 11 to 13, in accordance with the number of suction pads 92b to be used.

The first main controller 110 controls the first sub-controller 100 to drive the moving device 93, thereby bringing the suction hand 92 to a position above the identified mail piece M and defining it as the first orientation.

When the suction hand 92 is in the first orientation, the first main controller 110 drives the pump 91a and moves the suction hand 92 downward until it comes into contact with the mail piece M. Before this pump 91a is driven, the electromagnetic valve 94a is closed. The first main controller 110 stops driving the moving device 93 when the suction hand 92 in the first orientation is lowered to a position for suctioning the identified mail piece M. When it is determined that the mail piece M is suctioned based on the detection result of the pressure sensor 94b, the first main controller 110 transports the mail piece M to the placing surface 41 of the recognition table 40.

Having transported the mail piece M to the placing surface 41, the first main controller 110 stops driving the pump 91a, and detaches the mail piece M by opening the electromagnetic valve 94a (step ST8). In this manner, the mail piece M is placed onto the placing surface 41 of the recognition table 40.

When it is determined that a mail piece M is present on the placing surface 41 (yes at step ST3), the first main controller 110 controls the first sub-controller 100 to drive the conveyor device 90, thereby transporting the mail piece M from the placing surface 41 to the first conveyor belt 70 (step ST9). Here, if the mail piece M on the placing surface 41 is not in the face-up orientation, the mail piece M is turned over so that the mail piece M can be placed on the transporting surface 71 of the first conveyor belt 70 in the face-up orientation.

The operation of transporting this mail piece M from the recognition table 40 to the first conveyor belt 70 will be described in detail with reference to FIG. 9. First, the second camera 50 captures an image of the mail piece M placed on the placing surface 41. The first main controller 110 detects the position of the mail piece M in the horizontal direction, the position of the mail piece M in the vertical direction, the orientation of the mail piece M, and the size of the mail piece M, based on the image captured by the second camera 50 (step ST91).

The first main controller 110 determines whether or not the mail piece M is in the face-down orientation, based on the image captured by the second camera 50. When it is determined that the mail piece M is in the face-up position (no at step ST92), the first main controller 110 determines the suction pads 92b to be used based on the size of the mail piece M. The relationship between the size of the mail piece M and the number of suction pads 92b is pre-stored. The first main controller 110 determines the suction pads 92b to be used, based on this pre-stored information (step ST93).

When the suction pads 92b to be used have been determined, the first main controller 110 controls the first sub-controller 100 to drive the moving device 93, thereby moving the suction hand 92 above the placing surface 41. The first main controller 110 further drives the moving device 93 to change the suction hand 92 to the first orientation with respect to the mail piece M (step ST94). In the first orientation, the center lines C of the suction pads 92b run parallel to the vertical direction.

When the orientation of the suction hand 92 is changed to the first orientation, the first main controller 110 closes the electromagnetic valve 94a of the pipe 94 which is connected to the suction pads 92b to be used, and drives the pump 91a.

When driving the pump 91a with the electromagnetic valve 94a closed, the first main controller 110 moves the suction hand 92 downward based on the information on the position of the mail piece M in the vertical direction, and presses the suction hand 92 against the mail piece M while keeping the suction hand 92 in the first orientation. When the suction hand 92 is lowered to a position for suctioning the mail piece M, the first main controller 110 stops driving the moving device 93. With the pump 91a driven, causing a negative pressure inside the suction pads 92b, the mail piece M is suctioned by the suction pads 92b (step ST95).

The first main controller 110 determines whether or not the mail piece M is suctioned by the suction pad 92b, based on the detection result of the pressure sensor 94b. When it is determined that the mail piece M is suctioned by the suction pad 92b, the first main controller 110 controls the first sub-controller 100 to drive the moving device 93, thereby transporting the mail piece M to a position above the release position P1 of the first conveyor belt 70 (step ST96).

Here, the orientation of the suction hand 92 is set such that the front surface of the mail piece M faces up; for example, the orientation is such that the center lines C of the suction pads 92b run parallel to the vertical direction.

When transporting the mail piece M to a position above the release position P1, the first main controller 110 controls the first sub-controller 100 to drive the vertical movement section 97 of the moving device 93, thereby moving the suction hand 92 and the mail piece M downward.

When it is detected that the mail piece M is lowered to the release position P1 based on the detection result of the second detection sensor 80, the first main controller 110 stops moving the suction hand 92 (step ST97).

After stopping the driving of the moving device 93, the first main controller 110 stops the driving of the pump 91a and opens the electromagnetic valve 94a. With the pump 91a stopped and the electromagnetic valve 94a opened, the inside of the suction pad 92b becomes equal to the atmospheric pressure, achieving a so-called vacuum break (step ST98). The vacuum break deactivates the suction force, and therefore the mail piece M is detached from the suction pads 92b and falls onto the transporting surface 71 with the front surface facing up (step ST98).

After stopping the driving of the pump 91a and then opening the electromagnetic valve 94a, the first main controller 110 controls the first sub-controller 100 to drive the moving device 93, thereby moving the suction hand 92 upward (step ST99). After moving the suction hand 92 upward, the first main controller 110 performs the operation starting from step ST1.

When it is determined at step ST92 that the mail piece M on the placing surface 41 of the recognition table 40 is in the face-down orientation (yes at step ST92), the first main controller 110 determines the number of suction pads 92b to be used, based on the size of the mail piece M (step ST100).

When the suction pads 92b to be used have been determined, the first main controller 110 controls the first sub-controller 100 to drive the moving device 93, and moves the suction hand 92 above the placing surface 41. The first main controller 110 further drives the moving device 93 to change the suction hand 92 to the second orientation with respect to the mail piece M (step ST101). In the second orientation, the center lines C of the suction pads 92b run parallel to the vertical direction.

When the suction hand 92 is changed to the second orientation, the first main controller 110 closes the electromagnetic valve 94a and drives the pump 91a. After closing the electromagnetic valve 94a and driving the pump 91a, the first main controller 110 moves the suction hand 92 downward based on the information on the position of the mail piece M in the vertical direction, and presses the suction pads 92b against the mail piece M, while keeping the suction hand 92 in the second orientation with respect to the mail piece M. With the pump 91a driven, causing a negative pressure inside the suction pads 92b, the mail piece M is suctioned by the suction pads 92b (step ST102).

The first main controller 110 determines whether or not the mail piece M is suctioned by the suction pads 92b, based on the detection result of the pressure sensor 94b. When it is determined that the mail piece M is suctioned by the suction pads 92b, the first main controller 110 controls the first sub-controller 100 to drive the moving device 93, thereby transporting the mail piece M to a position above the release position P1 of the first conveyor belt 70 (step ST103). Here, the orientation of the suction hand 92 is set such that the front surface of the mail piece M faces up; for example, the center lines of the suction pads 92b are parallel to the vertical direction.

When transporting the mail piece M to a position above the release position P1, the first main controller 110 controls the first sub-controller 100 to drive the moving device 93, thereby bringing the fourth rotation axis R4 of the turning-over section 99 to be parallel to the width direction of the first conveyor belt 70. Furthermore, the first main controller 110 drives the turning-over section 99 to change the orientation of the suction hand 92 so that the angle formed between the center lines C of the suction pads 92b and the horizontal line L2 parallel to the horizontal direction reaches (90-α) degrees (step ST104). That is, the orientation is such that the direction substantially perpendicular to the suction surface 92c is tilted with respect to the vertical direction. Such an orientation of the suction hand 92 is referred to as a third orientation.

With the suction hand 92 in the third orientation, the direction of the shorter side of the mail piece M runs parallel to the width direction of the first conveyor belt 70. The angle formed between the extended surface of the suction surface of the mail piece M, which is suctioned by the suction pads 92b, and the transporting surface 71 of the first conveyor belt 70 is determined as α.

When the suction hand 92 is in the third orientation, if three suction pads 92b are used, two of the suction pads 92b are positioned below the center C2 of the mail piece M, and one of the suction pads 92b is positioned above the center C2 of the mail piece M.

When two suction pads 92b are used, one of the suction pads 92b is positioned above the center C2 of the mail piece M, while the other suction pad 92b is positioned below the center C2 of the mail piece M.

When two or more suction pads 92b are used, the first main controller 110 opens the electromagnetic valve 94a which is connected to the suction pad 92b positioned above the center of the mail piece M. With the electromagnetic valve 94a opened, a vacuum break is achieved on the suction pad 92b connected to the pipe 94 having this electromagnetic valve 94a (step ST105).

With the vacuum break, the suction of the mail piece M by this suction pad 92b is released. As a result, the state in which the mail piece M is suctioned by the suction pads 92b positioned below the center C2 of the mail piece M is maintained. When a single suction pad 92b is used, the first main controller 110 does not open the electromagnetic valve 94a.

When two or more suction pads 92b are used and the vacuum break is achieved by some of the suction pads 92b as described above, the first main controller 110 controls the first sub-controller 100 to drive the moving device 93, thereby moving the suction hand 92 downward while maintaining the third orientation.

When it is detected that the mail piece M is moved to a predetermined height with respect to the transporting surface 71 based on the detection result of the second detection sensor 80, the first main controller 110 controls the first sub-controller 100 to further drive the moving device 93 so as to bring the mail piece M into contact with the transporting surface 71 of the first conveyor belt 70 (step ST106).

The time required from the detection of the lower end of the mail piece M by the second detection sensor 80 to the contact made between the lower end and the transporting surface 71 can be calculated in advance, based on the distance between the predetermined height detected by the second detection sensor 80 and the transporting surface 71 and the moving speed of the suction hand 92 in the vertical direction by the moving device 93. In the present embodiment, the first main controller 110 determines that the mail piece M is in contact with the transporting surface 71, based on the required contact time calculated in advance.

The first main controller 110 determines that the mail piece M is brought into contact with the transporting surface 71 when the required contact time has elapsed after the detection of the mail piece M by the second detection sensor 80, and stops the driving of the moving device 93.

The driving of the moving device 93 may be stopped immediately after the required contact time elapsed. Alternatively, the driving of the moving device 93 may be stopped after an additional, predetermined time elapsed after the elapse of the required contact time. For example, the drive stop timing of the moving device 93 may be determined in accordance with the material and thickness of the mail piece M. For example, if the mail piece M is rigid or has a considerable thickness, the driving of the moving device 93 is stopped immediately after the required contact time elapses. If the mail piece M has a small thickness or the mail piece M is non-rigid, the driving of the moving device 93 may be stopped after a predetermined additional time elapsed after the elapse of the required contact time.

When stopping the driving of the moving device 93, the first main controller 110 stops the driving of the pump 91a and opens the electromagnetic valve 94a. When the driving of the pump 91a is stopped and the electromagnetic valve 94a is opened, the pressure inside of the suction pads 92b becomes the atmospheric pressure, achieving a vacuum break (step ST107).

When the vacuum break of the suction pads 92b is achieved, the mail piece M is placed in the face-up orientation due to friction produced between the lower end of the mail piece M and the transporting surface 71. In addition, with the vacuum break of the suction pads 92b, the suction pads 92b return to their original length by their own resilience. Here, the lower end of the mail piece M is pushed toward the downstream side of the first conveyor belt 70 in the transporting direction. With the lower end portion of the mail piece M pushed forward, the mail piece M can be smoothly laid in the face-up orientation.

The mail piece M detached from the suction pad 92b and placed on the transporting surface 71 is transported by the first conveyor belt 70 to the postmarking system 130.

After stopping the driving of the pump 91a and then opening the electromagnetic valve 94a, the first main controller 110 controls the first sub-controller 100 to drive the moving device 93, thereby moving the suction hand 92 upward (step ST108).

When raising the suction hand 92 to the initial position, the first main controller 110 controls the first sub-controller 100 to drive the moving device 93, thereby changing the conveyor device 90 to the initial orientation (step ST109). After moving the conveyor device 90 to the initial position and to the initial orientation, the first main controller 110 returns to the control at step ST1.

Next, the operation of the postmarking system 130 will be described. As shown in FIG. 10, the second main controller 190 initiates driving of the second conveyor belt 140 (step ST21). When initiating the driving of the second conveyor belt 140, the second main controller 190 controls the second sub-controller 180 to drive the postmarking device 170, and moves the stamper above the ink table 135 (step ST22).

The second main controller 190 determines whether or not any mail piece M is present at the postmarking position P2 of the second conveyor belt 140, based on the detection result obtained by the fourth detection sensor 150 (step ST23).

When it is determined that a mail piece M is present at the postmarking position P2 (yes at step ST23), the second main controller 190 stops driving the second conveyor belt 140 (step ST24). The second main controller 190 continues driving the second conveyor belt 140 until a mail piece M is fed to the postmarking position P2 (no at step ST23).

After stopping the driving of the second conveyor belt 140, the second main controller 190 initiates a stamp recognition process based on the image of the mail piece M placed at the postmarking position P2, which is captured by the third camera 160 (steps ST25 and ST26).

The mail piece M fed from the picking system 20 to the postmarking system 130 is placed in a face-up orientation.

For this reason, if it is determined that the mail piece M is unstamped (no at step ST26), it is assumed that no stamp is originally affixed to the mail piece M. In this case, the second main controller 190 terminates the operation of the postmarking system 130.

If the second main controller 190 determines that it is stamped (yes at step ST26), the second main controller 190 detects the position of the stamp, and controls the second sub-controller 180 to drive the postmarking device 170, thereby moving the stamper above the stamp (step ST27).

After moving the stamper above the stamp, the second main controller 190 controls the second sub-controller 180 to drive the postmarking device 170, thereby moving the stamper downward. The second main controller 190 continues moving the stamper downward until the stamper is brought into contact with the stamp (step ST28).

When the stamper is moved to a position where it is in contact with the stamp, the second main controller 190 determines that the stamp is canceled, and controls the second sub-controller 180 to drive the postmarking device 170, thereby raising the stamper (step ST29). After the stamper is raised to a predetermined position, the second main controller 190 returns to the control of step ST21.

The picking system 20 of the picking and postmarking system 10 configured as described above picks up a mail piece M from the placing table 5 and transports it to the first conveyor belt 70 by the conveyor device 90, and, if the stamped surface is not facing up, the picking system 20 turns the mail piece M over.

As described above, the transport and turning over of mail pieces M can be conducted by a single conveyor device 90, which can reduce the footprint of the picking system 20. Furthermore, no separate device for turning over the mail pieces M is required in addition to the device for transporting the mail pieces M, which can reduce costs of the picking system 20. Since picking from the placing table 5 and turning over is conducted by the conveyor device 90, the operation efficiency can also be improved.

Furthermore, the mail piece M is brought into contact with the transporting surface 71 of the first conveyor belt 70 with the suction hand 92 maintained in the third orientation, and therefore the angle α between the suction surface of the mail piece M and the transporting surface 71 can be set to 90 degrees or less. As a result, when the suction by the suction pad 92b is released, the mail piece M is smoothly turned over by the frictional force produced between the mail piece M and the transporting surface 71, bringing the stamped front surface to the face-up orientation.

By bringing the suction hand 92 to the third orientation when moving the mail piece M downward to the transporting surface 71, or in other words, by determining the angle α formed between the mail piece M and the transporting surface 71 to be less than 90 degrees, such as 80 degrees, the mail piece M can be smoothly turned over.

Three suction pads 92b are configured to have a positional relationship in which, in the third orientation with respect to the mail piece M, only one suction pad 92b is placed above the center C2 of the mail piece M, while the remaining two suction pads 92b are placed below the center C2 of the mail piece M. With such a relationship, by causing a vacuum break for only the suction pad 92b positioned above, and thereafter causing a vacuum break for the suction pads 92b positioned below, the mail piece M can be smoothly turned over by the force of the below-positioned suction pads 92b returning to their original length.

The three suction pads 92b are further configured to have a positional relationship in which, when the suction hand 92 is in the third orientation, two of the suction pads 92b are positioned below the center of the mail piece M, and the center lines C of the below-positioned suction pads 92b are vertically shifted. With such a relationship, even if a vacuum break occurs first for the suction pad 92b positioned above the center C2 of the mail piece M, the generation of a rotation moment on the mail piece M can be prevented. Thus, the mail piece M is protected from being broken by the rotation of the mail piece M.

Furthermore, if the mail piece M needs to be turned over, the suction hand 92 is set to the second orientation on the recognition table 40 with respect to the mail piece M, and then the suction hand 92 is brought to the third orientation on the first conveyor belt 70, as a result of which the lower edge of the mail piece M is placed parallel to the transporting surface 71 of the first conveyor belt 70.

Thus, when bringing the mail piece M into contact with the transporting surface 71, the entire lower edge of the mail piece M is in contact with the transporting surface 71, which can increase the frictional force between the mail piece M and the transporting surface 71. With the increased frictional force between the mail piece M and the transporting surface 71, the mail piece M can be smoothly turned over.

When the suction hand 92 is in the third orientation, the width direction of the mail piece M is parallel to the width direction of the first conveyor belt 70. Thus, when the mail piece M is detached from the suction pads 92b and placed on the transporting surface 71, the mail piece M can be prevented from protruding from the transporting surface 71.

By setting the suction hand 92 with respect to the mail piece M to the first orientation when transporting the mail piece M from the placing table 5 to the recognition table 40, the mail piece M can be stably transported.

The postmarking system 130 can affix a postmark in accordance with the position of the mail piece M by the postmarking device 170.

According to the present embodiment, the first main controller 110 detects the height position of the mail piece M based on the image captured by the first camera 30, and determines, based on this detected height position, the stop position when moving the suction hand 92 downward. As another example, the suction hand 92 may be provided with a contact sensor, and based on the detection result of this contact sensor, the contact of the suction pad 92b with the mail piece M may be determined so that the downward movement of the suction hand 92 can be stopped.

Similarly, the first main controller 110 detects the height position of the mail piece M on the recognition table 40 based on the image captured by the second camera 50, and, based on this detected height position, determines the stop position when moving the suction hand 92 downward. In another example, the suction hand 92 may be provided with a contact sensor, and based on the detection result obtained by this contact sensor, the contact of the suction pad 92b with the mail piece M may be determined so that the downward movement of the suction hand 92 can be stopped.

Furthermore, the picking and postmarking system 10 in the present embodiment is employed as part of the system for postmarking the mail piece M, which is not a limitation. For example, an article to be transported other than a mail piece M may be picked up from the placing section, and if it needs to be turned over, the article may be turned over and transported to the transport destination.

In the present embodiment, the first conveyor belt 70 and the second conveyor belt 140, which have a transporting surface on which the to-be-transported article is placed and transport the to-be-transported article by moving this transporting surface, are given as an example of a conveyor. The conveyor is not limited to a structure having an endless belt like a conveyor belt.

Furthermore, the recognition table 40 is employed in the present embodiment to improve the detection accuracy of the center C1, size, and the like of the mail piece M, which is not a limitation. If a sufficient detection accuracy of necessary information such as the center C1 and size of the mail piece M can be achieved based on the image captured by the first camera 30 on the placing table 5, the recognition table 40 may not be incorporated. If this is the case, the mail piece M is transported directly from the placing table 5 to the first conveyor belt 70.

In the present embodiment, the cylindrical suction pads 92b are used as an example of the suction unit that suctions a mail piece M. The suction unit is not limited to a cylindrical shape. For example, the suction unit may be configured to be an outer body shape formed into a rectangular cuboid, and a suction hole may be formed in this body. A plurality of suction holes may be formed. If this is the case, these suction holes serve as a suction unit.

In the present embodiment, when the mail piece M is turned over, the mail piece M is moved in an orientation of being inclined with respect to the vertical direction until the mail piece M comes into contact with the transporting surface 71 of the first conveyor belt 70. That is, the angle $\alpha$ is set to less than 90 degrees. In another example, $\alpha$ may be 90 degrees.

When $\alpha$ is less than 90 degrees, the mail piece M is inclined with respect to the vertical direction, as a result of which the suction hand 92 is positioned between the mail piece M and the transporting surface 71.

In the present embodiment, the turning-over section 99 is configured, as one example, to be rotatable 360 degrees in two directions around the fourth rotation axis R4, but this is not a limitation. The turning-over section 99 will suffice if it can rotate the suction hand 92 from an orientation in which the suction pads 92b face down and the suction surfaces 92c of the suction pads 92b intersect the vertical direction (gravity direction) to an orientation in which the mail piece M is positioned above the suction pads 92b and the direction perpendicular to the suction surfaces 92c is inclined with respect to the vertical direction. Here, the orientation in which the suction pads 92b face down and the suction surfaces 92c of the suction pads 92b intersect the vertical direction is not limited to the orientation in which the suction surfaces 92c is orthogonal to the vertical direction. However, the orientation is preferably such that, when the suction by the suction pads 92b is released from this orientation to drop the mail piece M onto the transporting surface 71 of the first conveyor belt 70, the front and back sides of the mail piece M would fall onto the transporting surface 71 without being turned over.

In this embodiment, when the mail piece M is to be turned over, the suction by the in-use suction pad 92b located above the center of the mail piece M is released first, and then the mail piece M is moved downward to bring the mail piece M into contact with the transporting surface 71. When the mail piece M comes into contact with the transporting surface 71, the suction by the in-use suction pad 92b located below the center of the mail piece M is released (steps ST105, ST106 and ST107). That is, when the suction hand 92 is in the orientation such that the mail piece M is positioned above the suction pads 92b along the gravity direction with the direction substantially orthogonal to the suction surface 92c being inclined with respect to the gravity direction, the suction by a suction pad, from among the plurality of currently suctioning suction pads 92b, farther away from the first conveyor belt 70 with respect to the approximate center of the plurality of currently suctioning suction pads 92b is released. Thereafter, the mail piece M is moved by the moving device 93 in a direction toward the transporting surface 71 to bring the mail piece M into contact with the transporting surface 71, and then the suction of the mail piece M by the remaining suction pads 92b is released.

However, the suction by the in-use suction pads 92b may be released after the mail piece M is brought into contact with the transporting surface 71. That is, the mail piece M may be moved by the moving device 93 in a direction toward the transporting surface 71 and brought into contact with the transporting surface 71. Then, among the plurality of suction pads 92b that are in use, the suction by the suction pad 92b suctioning in a direction away from the first conveyor belt 70 with respect to the approximate center of the in-use suction pads 92b may be released, and thereafter the suction of the mail piece M by the remaining suction pads 92b may be released.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A picking system comprising:
a suction device including a suction hand that includes a suction unit configured to suction a transport target article by negative pressure, and a pump that exerts the negative pressure onto the suction unit;
a conveyor having a transporting surface;
a moving device configured to move the suction hand from a placing unit on which the transport target article is placed to the transporting surface, the moving device including a turning-over section configured to rotate the suction hand around an axis in a horizontal direction perpendicular to a gravity direction, from an orientation in which the suction unit faces down along the gravity direction and a suction surface of the suction unit intersects the gravity direction;
an imaging device configured to capture an image of the transport target article; and
a control device configured to control the suction device and the moving device, wherein when it is determined based on the image obtained by the imaging device that the transport target article needs to be moved to the transporting surface with a front side and back side of the transport target article turned over, the control device causes the suction unit to suction the transport target article, the moving device to transport the transport target article to a position above the transporting surface, the turning-over section to set the suction hand to an orientation in which the transport target article is positioned above the suction unit in the gravity direction and a direction substantially orthogonal to the suction surface is inclined with respect to the gravity direction, and the suction unit to release the suction of the transport target article, wherein
when the suction hand is in the orientation in which the transport target article is positioned above the suction unit in the gravity direction and the direction substantially orthogonal to the suction surface is inclined with respect to the gravity direction, the control device causes a suction unit of in-use suction units to release the suction, wherein the suction unit conducts the suction in a direction farther away from the conveyor with respect to an approximate center of the in-use suction units, and thereafter causes the moving device to move the transport target article in a direction toward the transporting surface to bring the transport target article in contact with the transporting surface, and a remaining suction unit to release the suction of the transport target article.

2. A picking system comprising:
a suction device including a suction hand that includes a suction unit configured to suction a transport target article by negative pressure, and a pump that exerts the negative pressure onto the suction unit;
a conveyor having a transporting surface;
a moving device configured to move the suction hand from a placing unit on which the transport target article is placed to the transporting surface, the moving device including a turning-over section configured to rotate the suction hand around an axis in a horizontal direction perpendicular to a gravity direction, from an orientation in which the suction unit faces down along the gravity direction and a suction surface of the suction unit intersects the gravity direction;
an imaging device configured to capture an image of the transport target article; and
a control device configured to control the suction device and the moving device, wherein when it is determined based on the image obtained by the imagine device that the transport target article needs to be moved to the transporting surface with a front side and back side of the transport target article turned over, the control device causes the suction unit to suction the transport target article, the moving device to transport the transport target article to a position above the transporting surface, the turning-over section to set the suction hand to an orientation in which the transport target article is positioned above the suction unit in the gravity direction and a direction substantially orthogonal to the suction surface is inclined with respect to the gravity direction, and the suction unit to release the suction of the transport target article, wherein
when the suction hand is in the orientation in which the transport target article is positioned above the suction unit in the gravity direction and the direction substantially orthogonal to the suction surface is inclined with respect to the gravity direction, the control device causes the moving device to move the transport target article in a direction toward the transporting surface and brings the transport target article into contact with the transporting surface, and causes a suction unit of in-use suction units to release the suction, wherein the suction unit conducts the suction in a direction farther away from the conveyor with respect to an approximate center of the in-use suction units, and thereafter causes remaining suction units to release the suction of the transport target article.

* * * * *